(12) United States Patent
Yamane et al.

(10) Patent No.: US 10,962,702 B2
(45) Date of Patent: Mar. 30, 2021

(54) INPUT DEVICE

(71) Applicant: PANASONIC INTELLECTUAL PROPERTY MANAGEMENT CO., LTD., Osaka (JP)

(72) Inventors: Shigeru Yamane, Osaka (JP); Hideaki Eto, Osaka (JP); Wahei Agemizu, Osaka (JP); Masahiro Kasano, Osaka (JP); Go Nakatani, Kyoto (JP); Hiroshi Morioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/590,831

(22) Filed: Oct. 2, 2019

(65) Prior Publication Data

US 2020/0110212 A1 Apr. 9, 2020

(30) Foreign Application Priority Data

Oct. 5, 2018 (JP) .............................. JP2018-189774
Oct. 5, 2018 (JP) .............................. JP2018-189876
Apr. 1, 2019 (JP) .............................. JP2019-069615

(51) Int. Cl.
*G06F 3/044* (2006.01)
*F21V 8/00* (2006.01)

(52) U.S. Cl.
CPC ......... *G02B 6/0055* (2013.01); *G02B 6/0046* (2013.01); *G06F 3/044* (2013.01)

(58) Field of Classification Search
CPC .. G02B 6/0021; G02B 6/0023; G02B 6/0046; G02B 6/0055; G06F 3/044

USPC ................................................ 345/170–178
See application file for complete search history.

(56) References Cited

U.S. PATENT DOCUMENTS

| 2007/0006493 A1* | 1/2007 | Eberwein | G02B 6/0021 40/204 |
| 2010/0026661 A1* | 2/2010 | Teramoto | G06F 3/04164 345/174 |
| 2011/0148816 A1* | 6/2011 | Jhu | G06F 3/0428 345/175 |
| 2012/0314348 A1* | 12/2012 | Moncrieff | B29C 45/14639 361/679.01 |

(Continued)

FOREIGN PATENT DOCUMENTS

JP 2009-130283 6/2009

*Primary Examiner* — Tony O Davis
(74) *Attorney, Agent, or Firm* — Greenblum & Bernstein, P.L.C.

(57) ABSTRACT

An input device includes: a light source that emits light; a first sheet including a design portion; a second sheet having a conductive pattern on which the light source is mounted and in which a touch sensor electrode is disposed in a position different from the light source; a body that is sandwiched between the first sheet and the second sheet to be integral therewith, and transmits the light emitted by the light source; and a guide disposed in a light path from the light source to the design portion, the guide guiding light transmitting through an inside of the body toward the design portion and being distinguished from the body. The light source and the light guide are disposed along a surface of the second sheet on a side facing the body. The body is integral with the light source and the light guide and encapsulates them.

14 Claims, 14 Drawing Sheets

(56) References Cited

U.S. PATENT DOCUMENTS

| | | | |
|---|---|---|---|
| 2014/0055373 A1* | 2/2014 | Powell | G02F 1/13363 |
| | | | 345/173 |
| 2014/0055688 A1* | 2/2014 | Petcavich | G06F 3/0412 |
| | | | 349/12 |
| 2014/0376257 A1* | 12/2014 | Sawada | G02B 6/005 |
| | | | 362/606 |
| 2015/0293390 A1* | 10/2015 | Tsunekawa | G02B 5/3025 |
| | | | 349/12 |
| 2016/0085101 A1* | 3/2016 | Saitoh | G02F 1/133536 |
| | | | 349/71 |
| 2016/0170510 A1* | 6/2016 | Lu | F24C 7/004 |
| | | | 345/173 |
| 2016/0272111 A1* | 9/2016 | Teng | F21V 3/02 |
| 2017/0033311 A1* | 2/2017 | Baek | H01L 51/5237 |
| 2017/0177148 A1* | 6/2017 | Lee | G06F 3/0446 |
| 2017/0192598 A1* | 7/2017 | Seen | G02B 6/0053 |
| 2018/0295222 A1* | 10/2018 | Jung | H04M 1/0266 |
| 2019/0196084 A1* | 6/2019 | Gipson | H05K 1/0274 |
| 2019/0196085 A1* | 6/2019 | Gipson | H05K 1/0353 |
| 2020/0110212 A1* | 4/2020 | Yamane | G06F 3/044 |

* cited by examiner

INPUT DEVICE

CROSS REFERENCE TO RELATED APPLICATIONS

This application claims the benefit of priority of Japanese Patent Application Number 2018-189876 filed on Oct. 5, 2018, Japanese Patent Application Number 2018-189774 filed on Oct. 5, 2018, and Japanese Patent Application Number 2019-069615 filed on Apr. 1, 2019, the entire contents of which are hereby incorporated by reference.

BACKGROUND

1. Technical Field

This present disclosure relates to an input device.

2. Description of the Related Art

An outer case for an electronic device including: a patterned first film; a flexible second film having a conductive pattern; and a base disposed between the first film and the second film is disclosed as a conventional input device in Japanese Unexamined Patent Application Publication No. 2009-130283 (PTL 1). LEDs are disposed on this outer case side, and the pattern of the first film is lighten up by illuminating a display with the LEDs.

SUMMARY

However, the input device according to PTL 1 can be improved upon.

In view of this, the present disclosure provides an input device capable of improving upon the above related art.

An input device according to an aspect of the present disclosure includes: a light source that emits light; a first sheet including a design portion; a second sheet having a conductive pattern on which the light source is mounted and in which a touch sensor electrode is disposed in a position different from the light source; a body that is sandwiched between the first sheet and the second sheet to be integral with the first sheet and the second sheet, and transmits the light emitted by the light source; and a guide disposed in a light path from the light source to the design portion, the guide guiding light transmitting through an inside of the body toward the design portion and being distinguished from the body, in which the light source and the guide are disposed along a surface of the second sheet on a side facing the body, and the body is integral with the light source and the guide and encapsulates the light source and the guide.

Furthermore, an input device according to an aspect of the present disclosure includes: a light source that emits light; a first sheet including a design portion; a second sheet having a conductive pattern on which the light source is mounted and in which a touch sensor electrode is disposed in a position different from the light source; and a body that is sandwiched between the first sheet and the second sheet to be integral with the first sheet and the second sheet, and transmits the light emitted by the light source, in which the light source is mounted on the second sheet so that an optical axis of the light emitted by the light source is directed toward the design portion, and the body is integral with the light source and encapsulates the light source.

These general and specific aspects may be implemented using a system, a method, an integrated circuit, a computer program, a computer-readable recording medium such as a CD-ROM, or any combination of systems, methods, integrated circuits, computer programs, or computer-readable recording media. Furthermore, the computer-readable recording media may be non-transitory computer-readable recording media.

An input device according to one aspect of the present disclosure is capable of improving upon the above related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
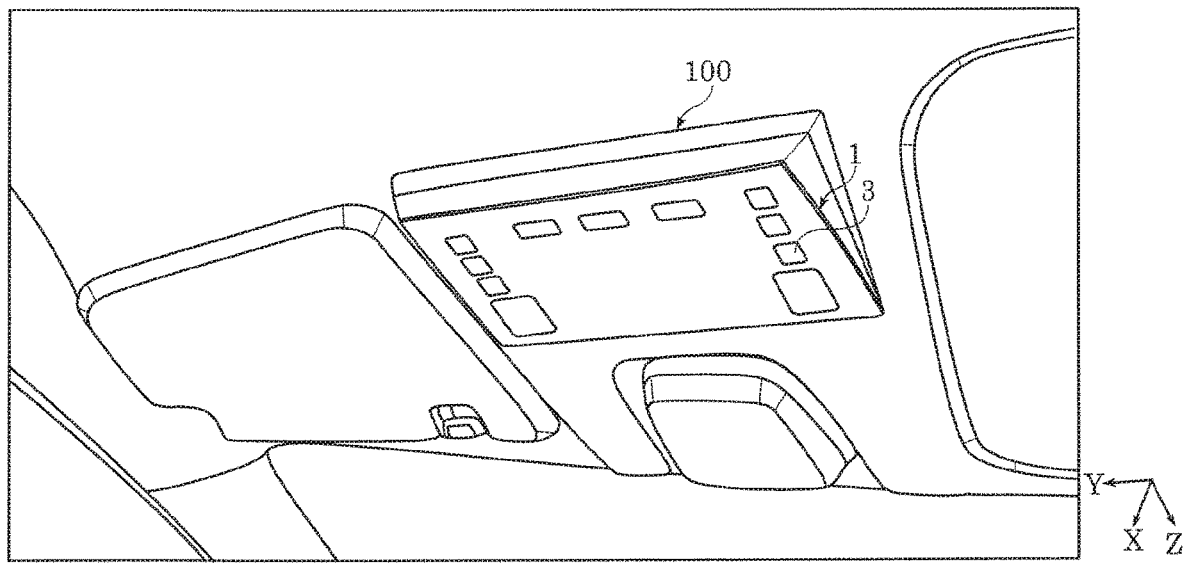
FIG. 1 is a perspective view illustrating an example of a storage box including an input device according to embodiment 1.

In the conventional input device, although the pattern of the first film can be lighten up when the LEDs are turned on, another pattern other than a desired pattern, e.g. a pattern adjacent to the desired pattern, also may be lighten up. In other words, light leakage occurs from the adjacent pattern. This prevents light having a sufficient brightness from being emitted through the desired pattern. Furthermore, in some circumstances where the input device is installed, a thinner input device may be required. However, in a configuration having the LEDs disposed on the outer case side as described in the conventional input device, the input device is thick.

In view of this, an input device according to an aspect of the present disclosure includes: a light source that emits light; a first sheet including a design portion; a second sheet having a conductive pattern on which the light source is mounted and in which a touch sensor electrode is disposed in a position different from the light source; a body that is sandwiched between the first sheet and the second sheet to be integral with the first sheet and the second sheet, and transmits the light emitted by the light source; and a guide disposed in a light path from the light source to the design portion, the guide guiding light transmitting through an inside of the body toward the design portion and being distinguished from the body, in which the light source and the guide are disposed along a surface of the second sheet on a side facing the body, and the body is integral with the light source and the guide and encapsulates the light source and the guide.

With this, the guide guides the light emitted by the light source toward the design portion. Accordingly, light is collected into the design portion.

Furthermore, the light source and the guide are disposed on the same surface of the second sheet on the side facing the body. Accordingly, the light source and the guide are disposed between the first sheet and the second sheet and integral with the body, and thus the input device is rarely thick.

Accordingly, in this input device, it is possible to emit high-brightness light through the design portion of the input device and achieve a thinner input device. Therefore, a user can easily visually recognize the pattern of the design portion. Furthermore, when the input device is installed on the mounting surface, the unevenness of the input device protruding from the mounting surface is reduced. Therefore, the input device can be also applied to the mounting surface of a thin component such as a cover included in a storage box and the input interfaces are made uniformly flat, and thus the design is improved.

Furthermore, an input device according to another aspect of the present disclosure includes: a light source that emits light; a first sheet including a design portion; a second sheet having a conductive pattern on which the light source is mounted and in which a touch sensor electrode is disposed in a position different from the light source; and a body that is sandwiched between the first sheet and the second sheet to be integral with the first sheet and the second sheet, and transmits the light emitted by the light source, in which the light source is mounted on the second sheet so that an optical axis of the light emitted by the light source is directed toward the design portion, and the body is integral with the light source and encapsulates the light source.

This case also has the same advantageous effects as described above.

Furthermore, in an input device according to another aspect of the present disclosure, the guide is a light guide having an incident surface which faces the light source and through which light enters, a light exit surface which faces the design portion and through which light exits, and a reflective surface which is a surface other than the incident surface and the light exit surface and reflects light transmitting through an inside of the light guide toward the light exit surface.

With this, in the light guide, light entering through the incident surface and transmitting through the inside of the light guide is incident on the first reflective surface (an example of the reflective surface), and is reflected at the first reflective surface. The light reflected at the first reflective surface exits through the light exit surface toward the design portion. Accordingly, light can be collected into the design portion. With this, in this input device, it is possible to emit higher brightness light through the design portion of the input device.

Furthermore, in an input device according to another aspect of the present disclosure, at least one of a light reflective sheet and a light reflective material layered on the light guide is disposed on the reflective surface.

With this, the light guide can more reliably emit light through the light exit surface.

Furthermore, in an input device according to another aspect of the present disclosure, the reflective surface has an inclined surface, and the inclined surface is disposed on an opposite side of the incident surface to the light source to interpose the incident surface between the light source and the inclined surface, and is disposed on an opposite side of the light exit surface to the design portion to interpose the light exit surface between the design portion and the inclined surface.

With this, the light emitted from the light source is incident on the inclined surface through the incident surface, and is reflected at the inclined surface toward the light exit surface. The light exiting through the light exit surface is easy to direct to the design portion, and thus light can be more efficiently collected into the design portion. With this, in this input device, it is possible to emit higher brightness light through the design portion of the input device.

Furthermore, in an input device according to another aspect of the present disclosure, the inclined surface is a freeform surface.

With this, even when the inclined surface is the freeform surface, this input device also has the same advantageous effects as described above. Furthermore, when the inclined surface is the freeform surface, the curvature of the inclined surface can be varied depending on the position, size, and shape of the design portion. Accordingly, it is possible to use the light guide adjusted to fit the design portion, and thus the design portion can be designed more flexibly in this input device.

Furthermore, in an input device according to another aspect of the present disclosure, a light diffusion material is dispersed in at least one of the incident surface, the light exit surface, and the inside of the light guide.

With this, the light diffusion material exists in the light path from the light source to the design portion, and thus it is possible to ensure the diffusion of transmitting light. Accordingly, the diffused light is collected into the design portion, and thus the design portion can emit light having almost even brightness.

Furthermore, in an input device according to another aspect of the present disclosure, a coloring material is dispersed in at least one of the incident surface, the light exit surface, and the inside of the light guide.

With this, the coloring material exists in the light path from the light source to the design portion, and thus it is possible to color the transmitting light (change the color of transmitting light) to a desired color.

Furthermore, in an input device according to another aspect of the present disclosure, a softening point of the light guide is higher than a softening point of the body.

For example, in manufacturing of the input device, the input device can be produced by placing the second sheet including the light source, the light guide, etc., in a mold and being insert-molded using a resin material to form the body. In this case, if the softening point of the light guide is lower than that of the resin material of which the body is made, the light guide may be melt in the insert molding. However, the softening point of the light guide is higher than that of the body, and thus it is possible to prevent melting of the light guide.

Furthermore, in an input device according to another aspect of the present disclosure, the guide is a light blocker having a light blocking effect, and the body includes the light path formed by the light blocker.

Furthermore, in an input device according to another aspect of the present disclosure, the light blocker is configured to have a non-light-transmissive film that does not transmit light or a light reflective film on at least one surface of a resin material.

Furthermore, an input device according to another aspect of the present disclosure further includes a light blocker having a light blocking effect, in which the body includes a light path formed by the light blocker from the light source to the design portion.

As described above, the light blocker forms the light path in the body, and thus it is possible to collect light into the design portion.

Furthermore, in an input device according to another aspect of the present disclosure, the light blocker is made of a white or black resin material.

With this, the light blocker has a light blocking function by reflecting light.

Furthermore, in an input device according to another aspect of the present disclosure, the first sheet blocks light other than light passing through a region of the design portion.

With this, light leakage from a portion other than the design portion can be prevented. Accordingly, it is possible to emit high-brightness light through the design portion.

Furthermore, an input device according to an aspect of the present disclosure further includes a connector disposed on a back surface of the second sheet and electrically connected with the conductive pattern and the touch sensor electrode, the back surface being on a side opposite to the side facing the body.

With this, the connector is disposed on the opposite surface of the second sheet to the light source, and electrically connected with the light source via the conductive pattern. Accordingly, the cable such as a flat cable is connected with the light source via the connector, and thus any conventional extended portions are unnecessary. With this, even when a stress is applied to the input device, breaking of a wire rarely occurs.

Accordingly, it is possible to prevent breaking of a wire in the input device.

Furthermore, in an input device according to an aspect of the present disclosure, the connector is electrically connected with a cable, and when the second sheet is viewed in a direction perpendicular to the second sheet, the cable does not protrude from the second sheet.

For example, if the cable protrudes from the second sheet when the second sheet is viewed in the direction perpendicular thereto, the protrusion of the cable from the input device makes a gap in the input device. This may reduce the waterproof effect or increase the size of the input device to cover the cable. However, if the cable does not protrude from the second sheet, this matter rarely occurs.

Furthermore, in an input device according to an aspect of the present disclosure, the cable is disposed within an angular range of from a direction along the back surface of the second sheet to a direction perpendicular to the second sheet.

With this, when the connector is disposed on the second sheet to be directed toward another connector to be connected, it is possible to smooth the pulling out of the cable electrically connected with the connector without folding the cable. Accordingly, it is possible to prevent breaking of the cable caused by forcing the cable to fold.

Furthermore, in an input device according to an aspect of the present disclosure, the second sheet has the conductive pattern on a front surface of the second sheet, and includes a through hole electrically connecting the connector and the conductive pattern, the front surface being on a side opposite to the back surface.

With this, the through hole can electrically connect the connector and the conductive pattern, and thus the connector can be surface-mounted on the second sheet. Accordingly, it is possible to reduce the size of the input device.

Furthermore, an input device according to an aspect of the present disclosure includes multiple through holes between the connector and the conductive pattern.

When the second sheet is insert-molded using a melted resin, the through hole may be broken by flow thereinto of the high temperature and pressure melted resin. However, when the through hole comprises multiple through holes, even if some of the through holes are broken, the remaining through holes electrically connect the conductive pattern on the front surface and the connector on the back surface. Accordingly, it is possible to ensure the reliability in the insert molding of the second sheet.

Furthermore, in an input device according to an aspect of the present disclosure, the second sheet has a planar portion and a curved portion, the planar portion being plate-shaped, and a width of the conductive pattern on the curved portion is greater than a width of the conductive pattern on the planar portion.

When the second sheet including the conductive pattern is formed, the conductive pattern on the second sheet is simultaneously formed. Accordingly, the conductive pattern may be broken by tension caused by the forming. However, the conductive pattern on the curved portion is greater in width than the conductive pattern on the planar portion, and thus breaking of the conductive pattern due to the forming rarely occurs.

Furthermore, in an input device according to an aspect of the present disclosure, the connector is disposed on the planar portion.

With this, the connector rarely floats from the back surface of the second sheet. Accordingly, the connector can be firmly fixed to the second sheet.

Furthermore, in an input device according to an aspect of the present disclosure, the second sheet further has a depressed portion that is deformed toward the first sheet, and the connector is disposed in the depressed portion.

With this, it is possible to prevent an increase in the thickness of the input device.

Furthermore, in an input device according to another aspect of the present disclosure, the second sheet is a flexible printed wiring board.

With this, the light source, etc., is easily mounted on the second sheet, and the touch sensor electrode is easily formed on the second sheet.

Furthermore, in an input device according to another aspect of the present disclosure, the light guide is disposed along the surface of the second sheet on the side facing the body so that at least a light emitting surface of the light source is covered.

For example, when the light emitting surface of the light source is away from the light guide, the light emitted from the light source transmits through the body and enters the light guide. The light transmitted through the light guide enters the body, and the light transmitted through the body is guided into the design portion. However, in the input device according to the aspect of the present disclosure, the light emitted from the light source transmits through the light guide and enters the body, and the light transmitted through the body is guided into the design portion. With this, the number of boundaries is reduced when light passes through the boundary between the body and the light guide each having a different refractive index, and thus it is possible to reduce attenuation of light caused by reflection at the boundaries.

Hereinafter, exemplary embodiments will be described with reference to the drawings. It should be noted that any of the following embodiments shows a specific example of the present disclosure. Therefore, numerical values, shapes, materials, structural components, the arrangement and connection of the structural components, etc. shown in the following embodiments are mere examples, and are not intended to limit the scope of the present disclosure. Furthermore, among the structural components in the following embodiments, components not recited in the independent claim which indicates the broadest concept of the present disclosure are described as arbitrary structural components.

Furthermore, each of the diagrams is a schematic diagram and thus is not necessarily strictly illustrated. In each of the diagrams, substantially the same structural components are assigned with the same reference signs, and redundant descriptions will be omitted or simplified.

Furthermore, in the following description, a "front surface" is a surface on the side on which the input device is visually recognized (a positive side along the X-axis, and hereinafter, referred to as a positive direction of the X-axis), and a "back surface" is a surface on the opposite side (a negative side along the X-axis, and hereinafter, referred to as a negative direction of the X-axis). Furthermore, the longitudinal direction of the input device perpendicular to the X-axis direction is defined as the Y-axis direction. A direction perpendicular to the X-axis direction and the Y-axis direction is defined as the Z-axis direction.

The following describes an input device according to an embodiment of the present disclosure.

Embodiment 1

(Configuration)

FIG. 1 is a perspective view illustrating an example of storage box 100 including input device 1 according to embodiment 1. FIG. 1 shows the inside of a car.

As shown in FIG. 1, storage box 100 is disposed in the inside of the car. Storage box 100 storages glasses, a wallet, etc. It should be noted that storage box 100 may be disposed in an airplane, facility such as a house, etc. as well as the car, and the location is not particularly limited.

Storage box 100 includes input device 1.

For example, input device 1 has functions for opening and closing storage box 100 and a ceiling window (e.g. a sunroof), turning on an illumination device in the car, etc. Input device 1 also serves as the cover of storage box 100. Input device 1 has operation interfaces 3 for performing such functions. Operation interfaces 3 are each a portion corresponding to design portion 110 described below. A user touches operation interfaces 3 to enable the functions of input device 1.

Figure 2:
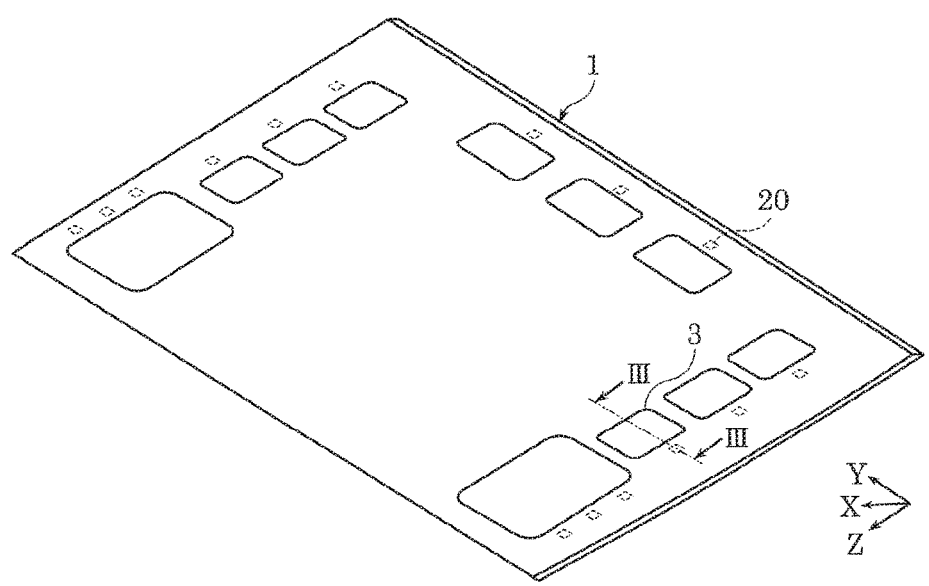
FIG. 2 is a perspective view illustrating an example of the input device according to embodiment 1.
Figure 3A:
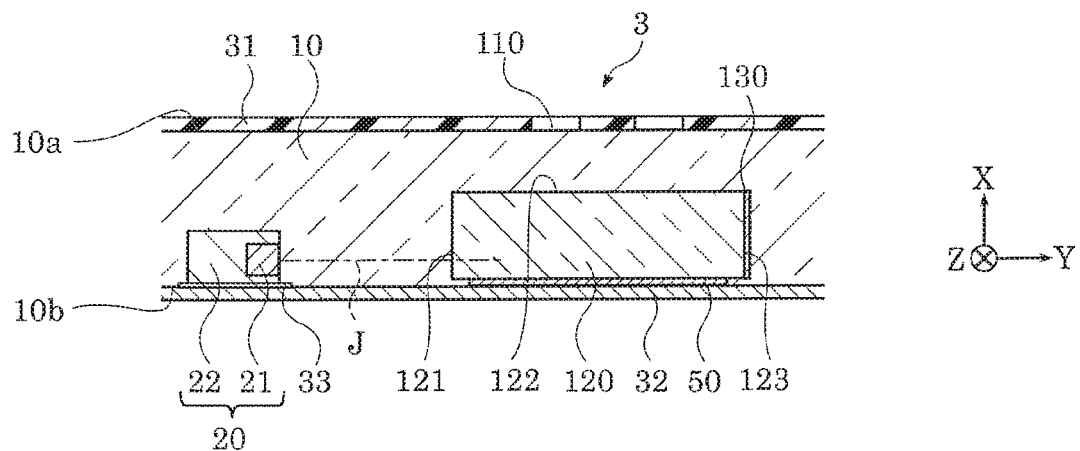
FIG. 3A is an exemplary cross-sectional view of the input device taken along the line III-III in FIG. 2.
Figure 4:
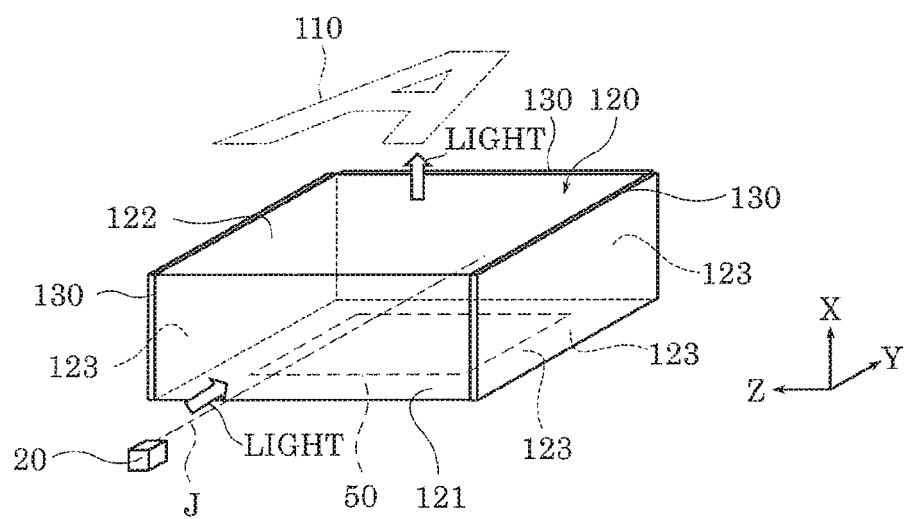
FIG. 4 is a schematic view illustrating an example of a light source, a light guide, and a design portion according to embodiment 1.
Figure 5:
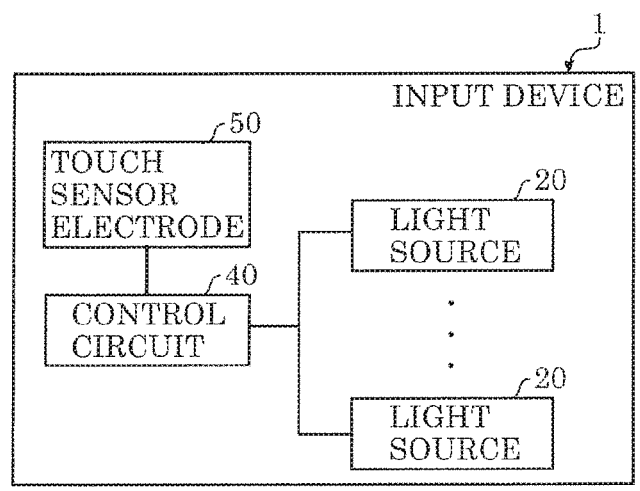
FIG. 5 is a block diagram illustrating an example of the input device according to embodiment 1.

Input device 1 is described with reference to FIGS. 2 to 5. FIG. 2 is a perspective view illustrating an example of input device 1 according to embodiment 1. FIG. 3A is an exemplary cross-sectional view of input device 1 taken along the line III-III in FIG. 2. FIG. 4 is a schematic view illustrating an example of light source 20, light guide 120, and design portion 110 according to embodiment 1. In FIG. 4, body 10, first sheet 31, second sheet 32, etc., are omitted. FIG. 5 is a block diagram illustrating an example of input device 1 according to embodiment 1.

As shown in FIG. 2, input device 1 is a plate panel. On input device 1, a pattern (design portion 110 described below) for the operation to open and close storage box 100, etc. is displayed. In FIG. 2, the pattern is omitted. The pattern is not particularly limited, and any pattern is possible.

As shown in FIGS. 2 to 5, input device 1 includes body 10, light sources 20, first sheet 31, second sheet 32, light guide 120, control circuit 40, and touch sensor electrode 50. It should be noted that control circuit 40 may be included inside body 10, or may be provided outside body 10.

Body 10 is light transmissive. Body 10 is a light-guide plate which guides light emitted from light source 20. In body 10, light emitted from light source 20 mounted on second sheet 32 is transmitted, and the transmitted light exits through design portion 110. Body 10 is made of a transparent material, e.g. a resin material such as acrylic or polycarbonate.

Furthermore, body 10 is integral with light source 20 and light guide 120 and encapsulates light source 20 and light guide 120. Body 10 is also integral with first sheet 31 and second sheet 32. Here, "integral" means not only bonding between different components but also encapsulating a component in another component.

As shown in FIG. 3A, first sheet 31 is layered onto front surface 10a of body 10. In first sheet 31, design portion 110 is formed. First sheet 31 blocks light other than light passing through the region of design portion 110. In this embodiment, first sheet 31 reflects light transmitted through body 10 toward second sheet 32. First sheet 31 is a paint material having a light reflection function, a light reflective sheet, etc., but may have a light absorption function. In this embodiment, first sheet 31 includes design portions 110 each associated with a corresponding one of operation interfaces 3.

Design portion 110 is a portion through which light exits input device 1. Design portion 110 is a region in which front surface 10*a* of body 10 is exposed, and is a space through which light transmitted through body 10 passes. In other words, design portion 110 is a region (space) in which there is no first sheet 31, and is defined by first sheet 31.

It should be noted that, as another example, design portion 110 may include a part (a protrusion) of body 10. In other words, the region in which there is no first sheet 31 may include body 10.

As yet another example, design portion 110 may include a decorative portion and a thin portion. The decorative portion is a light-transmissive film or sheet layer which is layered onto front surface 10*a* of body 10. The thin portion is a part of first sheet 31 which is layered onto the top surface (a surface on a positive side of the X-axis) of the decorative portion. In the thin portion, first sheet 31 is layered thinner than that in the other region. More specifically, the decorative portion corresponding to the pattern of design portion 110 is layered onto front surface 10*a* of body 10, and first sheet 31 is further layered thereonto. Accordingly, the surface of operation interface 3 in input device 1 is flat, but the top surface part of the decorative portion (the thin portion) is thin. With this, light transmits through the thin portion. In this manner, light may exit through design portion 110.

Light sources 20 emit light toward light guide 120. More specifically, in light sources 20, light-emitting elements 21 are sealed and fixed with a white resin (hereinafter, referred to as reflector 22). Then, light source 20 is mounted on second sheet 32 so that light is emitted in a positive direction of the Y-axis, as shown in FIG. 3A, for example. More specifically, light-emitting element 21 of light source 20 is disposed in body 10 so that the optical-axis direction of the emitted light, i.e. the positive direction of the Y-axis is crossed with light guide 120.

Light sources 20 each include a light emitting diode (LED) as light-emitting element 21, for example. Light sources 20 each emit light such as white light, blue light, red light, green light, etc. It should be noted that light sources 20 may each include light-emitting element 21 other than the LED. For example, an organic electro luminance (EL) bulb is possible.

It should be noted that light sources 20 each include the same type of light source, for example, the same type of light-emitting element 21 (e.g. LED). Furthermore, in this case, the same type of light-emitting element 21 means a light-emitting element which emits light at the same brightness level when the emitting condition (e.g. applied current or power) is the same.

Second sheet 32 is layered onto back surface 10*b* of body 10, and reflects light transmitting through body 10 toward first sheet 31, etc. Second sheet 32 has conductive pattern 33 on a side facing body 10, and serves as a circuit board. Furthermore, on the side facing body 10 (front surface side) of second sheet 32, light source 20 is mounted on conductive pattern 33 and touch sensor electrode 50 is disposed in a position different from light source 20. Furthermore, on the front surface side or the back surface side of second sheet 32, control circuit 40 in FIG. 5 is mounted. It should be noted that control circuit 40 may be mounted to another board electrically connected with conductive pattern 33 of second sheet 32.

Furthermore, second sheet 32 is, for example, a flexible printed wiring board to the surface of which a paint material is applied, or a light reflective sheet. As the base material of second sheet 32, a film such as polycarbonate, polyethylene terephthalate, or polyimide is used. In this embodiment, a flexible printed wiring board is used as second sheet 32.

Light guide 120 is a light-transmissive rectangular-shaped prism. Light guide 120 is distinguished from body 10. Light guide 120 is fixed to second sheet 32 on the front surface side to overlap at least a part of touch sensor electrode 50 when viewed along the X-axis, is disposed between body 10 and second sheet 32, and is disposed to face light source 20 across body 10. Light guide 120 is disposed on touch sensor electrode 50 on the positive side of the X-axis. When light guide 120, body 10, and first sheet 31 are viewed along the X-axis, at least a part of light guide 120 is overlapped with design portion 110. In this embodiment, light guide 120 is embedded inside body 10. It should be noted that in this embodiment, body 10 is formed between light guide 120 and first sheet 31, but body 10 is not always required. Light guide 120 is an example of a guide. Furthermore, the shape of light guide 120 is not limited to the rectangular prism, and may be a pyramid described below or a polyhedron disposed such that incident surface 121 is substantially perpendicular to optical axis J of light emitted from light source 20.

As shown in FIG. 3A and FIG. 4, light guide 120 includes incident surface 121, light exit surface 122, and first reflective surfaces 123.

Incident surface 121 is a surface through which light emitted from light source 20 enters (a surface on the negative side of the Y-axis). Incident surface 121 is a surface facing light source 20 across body 10, and is crossed with optical axis J.

Light exit surface 122 is a surface through which light transmitted through the inside of light guide 120 exits (a surface on the positive side of the X-axis). Light exit surface 122 is a surface facing design portion 110 across body 10.

First reflective surfaces 123 are each a surface that reflects light transmitting through the inside of light guide 120. First reflective surfaces 123 are each a surface other than incident surface 121 and light exit surface 122. In other words, first reflective surfaces 123 are surfaces of light guide 120 on the negative side of the X-axis, on the positive side of the Y-axis, on the positive side of the Z-axis, and on the negative side of the Z-axis. Reflective sheet 130 having a light reflection function is applied to each of first reflective surfaces 123. It should be noted that instead of reflective sheet 130, a reflective film may be applied to each of first reflective surfaces 123. Furthermore, reflective sheet 130 need not be applied. For example, first reflective surface 123 may be implemented by a difference in the refractive index between light guide 120 and body 10. For example, light guide 120 may be made of a material having a higher refractive index than that of body 10. First reflective surface 123 is an example of a reflective surface.

A light diffusion material may be dispersed in at least one of incident surface 121, light exit surface 122, and the inside of light guide 120. Furthermore, a coloring material may be dispersed in at least one of incident surface 121, light exit surface 122, and the inside of light guide 120. In other words, the light diffusion material and the coloring material are disposed in a light path from light source 20 to design portion 110. Both of the light diffusion material and the coloring material may be dispersed in light guide 120, or one of them may be selectively dispersed in light guide 120. Furthermore, for example, when the light emitted from light source 20 is white, the coloring material changes the color of light emitted from light source 20 to red, blue, yellow, green, etc.

It should be noted that the light diffusion material and the coloring material may be dispersed in body 10 between light guide 120 and first sheet 31, more specifically, the overlap between design portion 110 and body 10 of when first sheet 31 and body 10 are viewed from the front surface side.

Figure 3B:
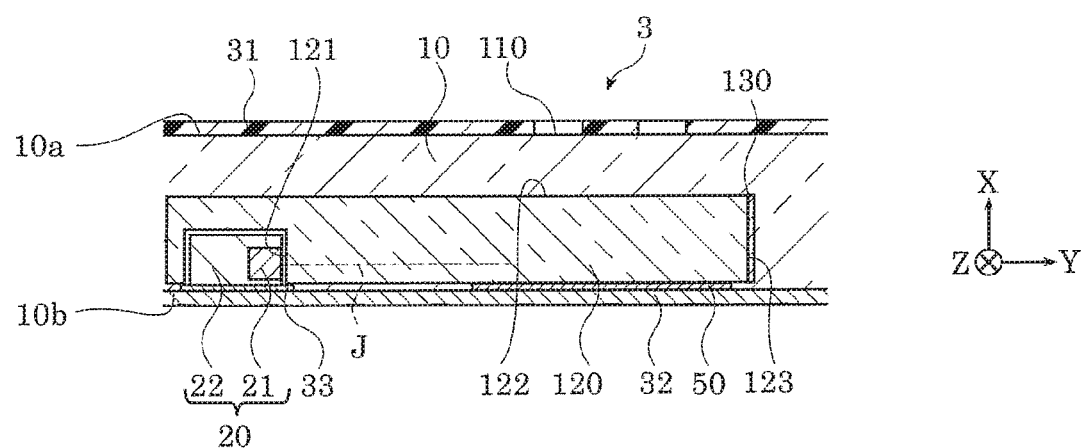
FIG. 3B is an exemplary cross-sectional view of the input device according to embodiment 1.
Figure 3C:
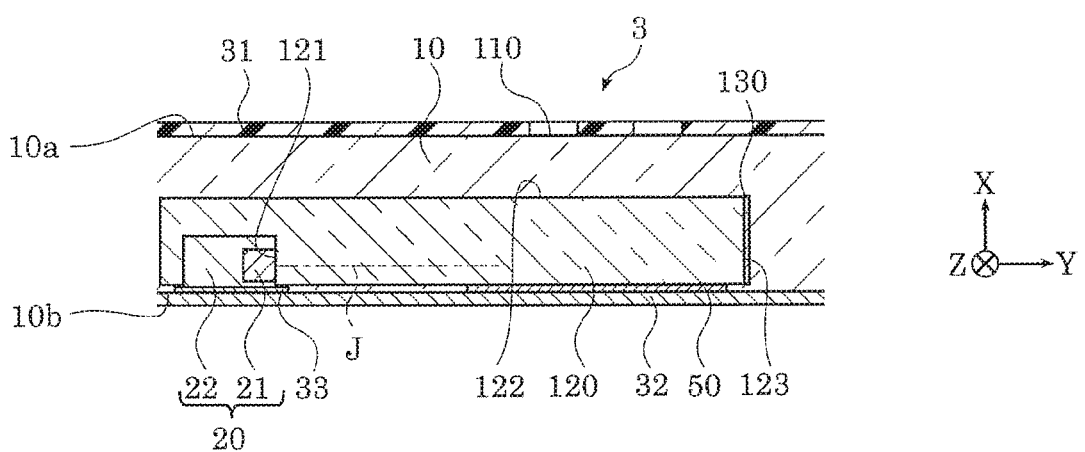
FIG. 3C is an exemplary cross-sectional view of the input device according to embodiment 1.
Figure 3D:
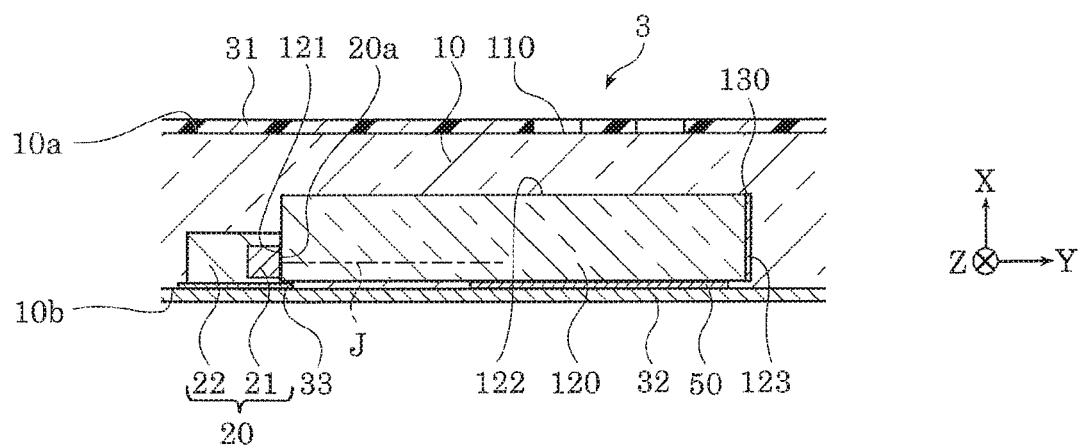
FIG. 3D is an exemplary cross-sectional view of the input device according to embodiment 1.

Furthermore, light guide 120 may be provided as shown in FIGS. 3B, 3C, and 3D. FIGS. 3B, 3C, and 3D are each an exemplary cross-sectional view of the input device according to embodiment 1.

As shown in FIG. 3B, light guide 120 may be elongated from touch sensor electrode 50 along the Y-axis so that light guide 120 encapsulates light source 20. In other words, light guide 120 prevents light source 20 from being in direct contact with body 10. In this case, for example, insert molding is performed after filling a space between light source 20 and light guide 120 with a thermoset resin such as epoxy.

Alternatively, as shown in FIG. 3C, light guide 120 and light source 20 may be integrally formed in advance.

With this configuration shown in FIG. 3B or 3C, in a process for forming body 10, it is possible to protect light source 20 against a high temperature and pressure melted resin material when body 10 is insert-molded using a resin material.

Alternatively, as shown in FIG. 3D, light guide 120 may be elongated along the Y-axis from touch sensor electrode 50 to light emitting surface 20a (also referred to as a light exit surface) of light source 20 which is a surface on the positive side of the Y-axis. Furthermore, light guide 120 is disposed along the surface of second sheet 32 on the side facing body 10 so that at least light emitting surface 20a of light source 20 is covered. Here, light emitting surface 20a is a surface orthogonal to optical axis J of light emitted from light source 20, and is parallel to the X-Z plane.

It should be noted that incident surface 121 of light guide 120 may be disposed in a position abutting or close to light emitting surface 20a of light source 20. Accordingly, light guide 120 is not limited to one shown in FIG. 3D.

In any cases, it is possible to cause light emitted from light source 20 to efficiently enter through incident surface 121 of light guide 120.

As shown in FIGS. 3A and 5, control circuit 40 controls the operation of light source 20. Control circuit 40 detects a touch position which is a position touched by a user, based on an output signal from touch sensor electrode 50. Control circuit 40 performs a function in associated with a position in design portion 110 corresponding to the detected touch position. For example, when operation interface 3 is touched during the detection of a position corresponding to design portion 110 by touch sensor electrode 50, control circuit 40 receives a command input in associated with a pattern indicated by design portion 110 in operation interface 3.

Furthermore, control circuit 40 causes input device 1, the ceiling window, the illumination device, etc. to operate in some operation modes. For example, control circuit 40 has an operation mode in which storage box 100 in FIG. 1 is opened and closed, an operation mode in which the ceiling window is opened and closed, an operation mode in which the illumination device in a car is turned on and off, etc. In other words, control circuit 40 causes input device 1, the ceiling window, the illumination device, etc. to operate in accordance with the pattern indicated by design portion 110.

For example, touch sensor electrode 50 is disposed on the front surface, the back surface, or the both surfaces of second sheet 32, and outputs the signal to control circuit 40 when a user touches. Touch sensor electrode 50 is, for example, a sensor electrode such as a capacitance sensor.

In FIG. 3A, touch sensor electrode 50 is sandwiched between second sheet 32 and light guide 120. Touch sensor electrode 50 and light guide 120 are overlapped when viewed along the X-axis. Furthermore, touch sensor electrode 50 is overlapped with design portion 110 when viewed along the X-axis, and is disposed on the surface of second sheet 32 on the side facing body in a position different from that of light source 20. Touch sensor electrode 50 and light source 20 are mounted along the surface of second sheet 32 on the side facing body 10. Here, in view of the thickness of input device 1, and the malfunction and sensitivity reduction of touch sensor electrode 50 due to a conductor included in light source 20 and conductive pattern 33 on which light source 20 is mounted, touch sensor electrode 50 is disposed directly under design portion 110 (on the negative side of the X-axis), light source 20 is not disposed between design portion 110 and touch sensor electrode 50, and touch sensor electrode 50 and light source 20 are disposed in different positions on the surface of second sheet 32 on the side facing body 10.

(Operation)

As shown in FIGS. 3A and 4, in such input device 1, for example, light emitted from light source 20 transmits through body 10 and enters light guide 120 through incident surface 121. The light entering through incident surface 121 transmits through the inside of light guide 120, and is incident on first reflective surface 123. The light incident on first reflective surface 123 is reflected toward light exit surface 122. The light exiting through light exit surface 122 is collected into design portion 110 in first sheet 31 (collected into design portion 110 and the vicinity of design portion 110). A part of the light collected into design portion 110 is emitted through design portion 110. The remaining part of the light is reflected at the back surface of first sheet 31 and returns back to light guide 120. Then, this light is collected into the vicinity of design portion 110 in first sheet 31 again, and the above is repeated.

Figure 6:
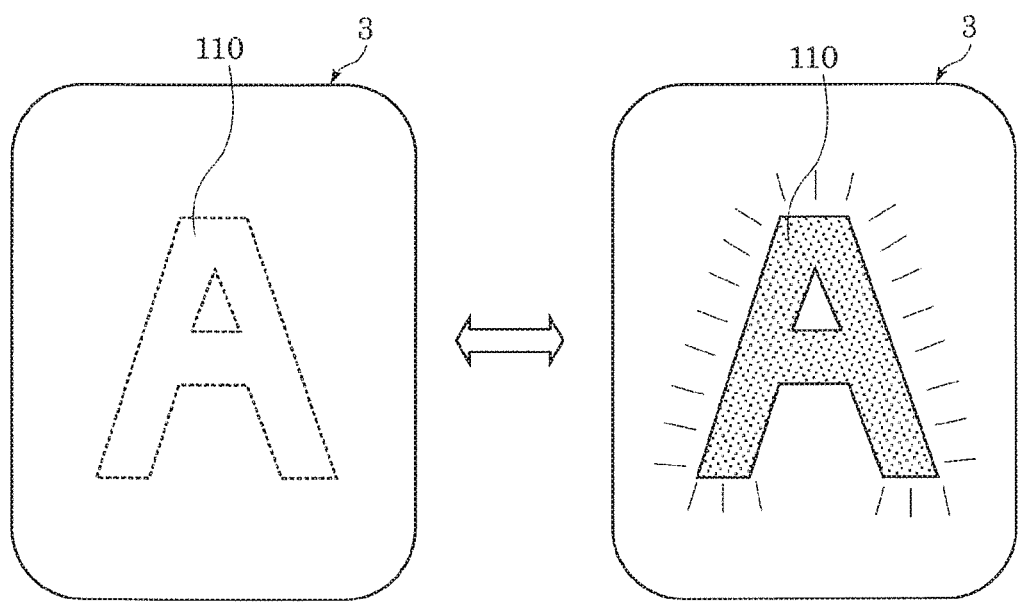
FIG. 6 is a plan view illustrating an example of light-on and light-off states of an operation interface in the input device according to embodiment 1.

FIG. 6 shows exemplary light-on and light-off states. FIG. 6 is a plan view illustrating an example of light-on and light-off states of operation interface 3 in input device 1 according to this embodiment.

As shown in FIG. 6, in the light-on state of light source 20, light is emitted through design portion 110 (from body 10 exposed in design portion 110). With this, a user can recognize the pattern of design portion 110 in the light-on state. On the other hand, in the light-off state, the surface of operation interface 3 in input device 1 is flat (uniform), and thus the user cannot visually recognize or is difficult to visually recognize the pattern of design portion 110.

Advantageous Effects

Next, the advantageous effects of input device 1 according to this embodiment will be described.

Input device 1 according to this embodiment include: light source 20 that emits light; first sheet 31 including design portion 110; second sheet 32 having conductive pattern 33 on which light source 20 is mounted and in which touch sensor electrode 50 is disposed in a position different from light source 20; body 10 that is sandwiched between first sheet 31 and second sheet 32 to be integral with first sheet 31 and second sheet 32, and transmits the light emitted by light source 20; and light guide 120 disposed in a light path from light source 20 to design portion 110, light guide 120 guiding light transmitting through an inside of body 10 toward design portion 110 and being distinguished from body 10. Furthermore, light source 20 and light guide 120 are disposed along a surface of second sheet 32 on a side facing body 10. Furthermore, body 10 is integral with light source 20 and light guide 120 and encapsulates light source 20 and light guide 120. Light guide 120 includes: light guide 120 has incident surface 121 which faces light source 20 and through which light enters, light exit surface 122 which faces design portion 110 and through which light exits, and first reflective surface 123 which is a surface other than incident surface 121 and light exit surface 122 and reflects light transmitting through an inside of light guide 120 toward light exit surface 122.

Accordingly, in light guide 120, light entering through incident surface 121 and transmitting through the inside of light guide 120 is incident on first reflective surface 123, and is reflected at first reflective surface 123. The light reflected at first reflective surface 123 exits through light exit surface 122 toward design portion 110. In this manner, it is possible to collect light into design portion 110.

Furthermore, light source 20 and light guide 120 are disposed on the same surface of second sheet 32 on the side facing body 10. This allows input device 1 according to this embodiment to be thinner than that of when the light source and the light guide are layered along the X-axis.

Accordingly, in this input device 1, it is possible to emit high-brightness light through design portion 110 of input device 1 and achieve thinner input device 1. Therefore, a user can easily visually recognize the pattern of design portion 110. Furthermore, when input device 1 is installed on the mounting surface in storage box 100, the unevenness of input device 1 protruding from the mounting surface in storage box 100 is reduced. Therefore, input device 1 can be also applied to the mounting surface of a thin component such as a cover included in storage box 100 and allow input interfaces (operation interfaces 3) to be uniformly flat, and thus the design is improved.

Furthermore, in input device 1 according to this embodiment, in light guide 120, a light diffusion material is dispersed in at least one of incident surface 121, light exit surface 122, and the inside of light guide 120. With this, it is possible to ensure the diffusion of light transmitting through light guide 120. The diffused light exits light guide 120 through light exit surface 122 and is collected into design portion 110, and thus design portion 110 can emit light having almost even brightness.

Furthermore, in input device 1 according to this embodiment, in light guide 120, a coloring material is dispersed in at least one of incident surface 121, light exit surface 122, and the inside of light guide 120. With this, it is possible to color the light transmitting through light guide 120 (change the color of light transmitting through light guide 120) to a desired color.

In input device 1 according to this embodiment, a softening point of light guide 120 is higher than a softening point of body 10. For example, in manufacturing of input device 1, input device 1 can be produced by placing second sheet 32 including light source 20, light guide 120, etc., in a mold and being insert-molded using a resin material to form body 10. In this case, if the softening point of light guide 120 is lower than that of the resin material of which body 10 is made, light guide 120 may be melt in the insert molding. However, the softening point of light guide 120 is higher than that of body 10, and thus it is possible to prevent melting of light guide 120.

Variation 1 of Embodiment 1

The configuration of an input device of variation 1 of embodiment 1 will be described with reference to FIGS. 7 and 8.

Figure 7:
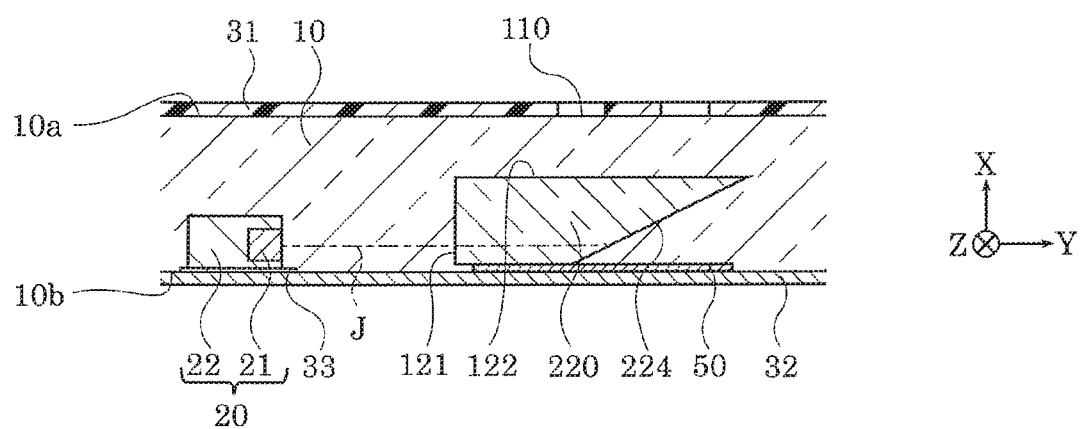
FIG. 7 is an exemplary cross-sectional view of an input device according to variation 1 of embodiment 1.
Figure 8:
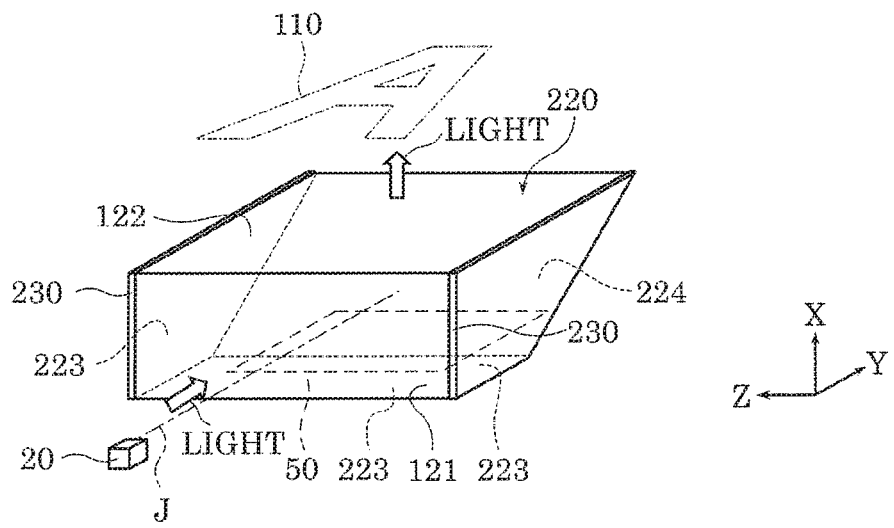
FIG. 8 is a schematic view illustrating an example of a light source, a light guide, and a design portion according to variation 1 of embodiment 1.

FIG. 7 is an exemplary cross-sectional view of the input device according to variation 1 of embodiment 1. FIG. 8 is a schematic view illustrating an example of light source 20, light guide 220, and design portion 110 according to variation 1 of embodiment 1. In FIG. 8, body 10, first sheet 31, second sheet 32, etc., are omitted.

Unless otherwise stated, other configurations according to this variation are the same as those according to embodiment 1. Substantially the same structural components are assigned with the same reference signs, and redundant descriptions will be omitted or simplified.

Light guide 220 is pyramid shaped, and the cross-sectional view is trapezoidal shaped. Light guide 220 includes incident surface 121 through which light emitted from light source 20 enters, first reflective surfaces 223 which reflect the light, and light exit surface 122 through which the light exits.

Some of first reflective surfaces 223 is inclined surface 224. First reflective surface 223 is an example of a reflective surface.

Inclined surface 224 is inclined relative to the Z-Y plane. Inclined surface 224 is crossed with optical axis J of light source 20. Inclined surface 224 is inclined upwardly (in the positive direction of the X-axis) in a direction away from light source 20 (in the positive direction of the Y-axis). When light guide 220, body 10, and first sheet 31 are viewed along the X-axis, at least a part of light guide 220 is overlapped with design portion 110. It should be noted that inclined surface 224 reflects light transmitting through the inside toward light exit surface 122. Inclined surface 224 totally reflects the light at the interface to body 10. Inclined surface 224 faces light source 20 across incident surface 121 and body 10, and also faces design portion 110 across light exit surface 122 and body 10. More specifically, inclined surface 224 is disposed on an opposite side of incident surface 121 to light source 20 (on the negative side of the Y-axis) to interpose incident surface 121 between light source 20 and inclined surface 224, and is disposed on an opposite side of light exit surface 122 to design portion 110 (on the negative side of the X-axis) to interpose light exit surface 122 between design portion 110 and inclined surface 224. It should be noted that reflective sheet 230 may be applied to inclined surface 224.

First reflective surfaces 223 are each a surface other than incident surface 121, inclined surface 224, and light exit surface 122. In other words, first reflective surfaces 223 are surfaces of light guide 220 on the negative side of the X-axis, on the positive side of the Z-axis, and on the negative side of the Z-axis. Reflective sheet 230 having a light reflection function is applied to each of first reflective surfaces 223. It should be noted that reflective sheet 230 need not be applied. For example, first reflective surface 223 may be implemented by a difference in the refractive index between light guide 220 and body 10. Furthermore, a light reflective film may be applied instead of reflective sheet 230. First reflective surface 223 may be implemented by dispersing a light reflective material having a light reflection function.

Reflective sheet 230 fitting the shape of first reflective surface 223 is applied to the surface of light guide 220 on the positive side of the Z-axis (first reflective surface 223) and the surface of light guide 220 on the negative side of the Z-axis (first reflective surface 223).

The advantageous effects of such an input device according to this variation will be described.

In the input device according to this variation, light guide 220 further includes inclined surface 224 facing light source 20 across incident surface 121 and facing design portion 110 across light exit surface 122.

Accordingly, light emitted from light source 20 is incident on inclined surface 224 through incident surface 121, and is reflected at inclined surface 224 toward light exit surface 122. The light exiting through light exit surface 122 is easy to direct to design portion 110, and thus light can be more efficiently collected into design portion 110. With this, in this input device, it is possible to emit higher brightness light through design portion 110 of the input device.

Variation 2 of Embodiment 1

The configuration of an input device of variation 2 of embodiment 1 will be described with reference to FIGS. 9 and 10.

Figure 9:
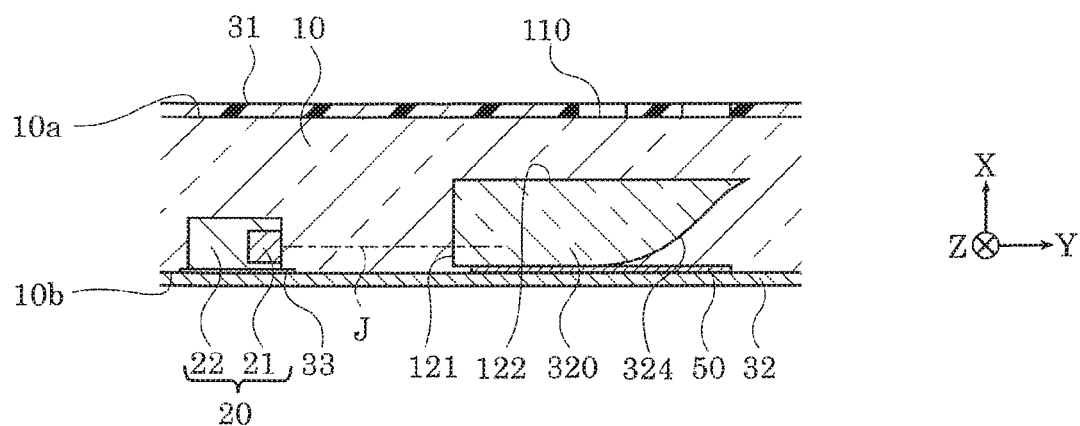
FIG. 9 is an exemplary cross-sectional view of an input device according to variation 2 of embodiment 1.
Figure 10:
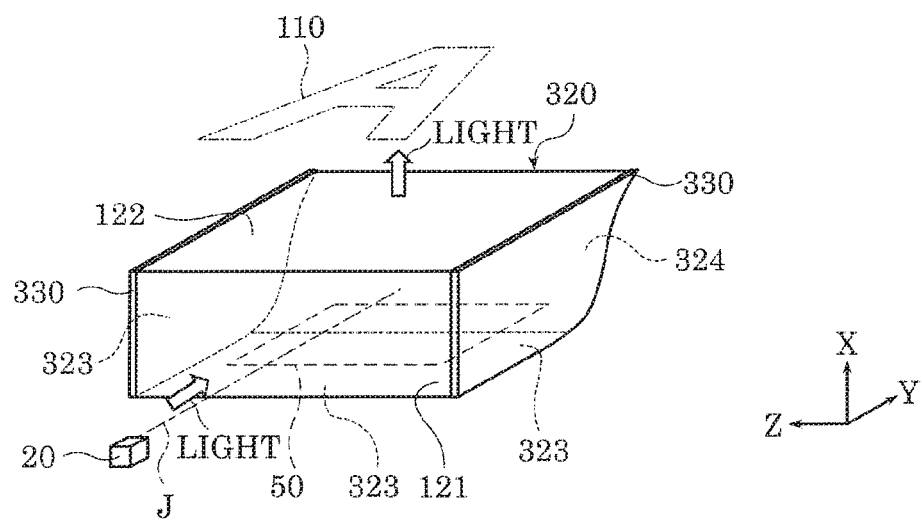
FIG. 10 is a schematic view illustrating an example of a light source, a light guide, and a design portion according to variation 2 of embodiment 1.

FIG. 9 is an exemplary cross-sectional view of the input device according to variation 2 of embodiment 1. FIG. 10 is a schematic view illustrating an example of light source 20, light guide 320, and design portion 110 according to variation 2 of embodiment 1. In FIG. 10, body 10, first sheet 31, second sheet 32, etc., are omitted.

Unless otherwise stated, other configurations according to this variation are the same as those according to variation 1 of embodiment 1. Substantially the same structural components are assigned with the same reference signs, and redundant descriptions will be omitted or simplified.

Light guide 320 is pyramid shaped, and the cross-sectional view is trapezoidal shaped. Light guide 320 includes incident surface 121 through which light emitted from light source 20 enters, first reflective surfaces 323 which reflect the light, inclined surface 324, and light exit surface 122 through which the light exits.

Like first reflective surface 323, inclined surface 324 has a light reflection function. First reflective surface 323 is an example of a reflective surface.

Inclined surface 324 is a freeform surface. Accordingly, the shape of inclined surface 324 is not limited to the shape shown in FIGS. 9 and 10 according to this variation. Based on the position, size, and shape of design portion 110, the curvature of inclined surface 324 may be varied depending on the region. Accordingly, it is possible to use inclined surface 324 fitting design portion 110, and thus design portion 110 can be designed more flexibly in this input device.

Reflective sheet 330 fitting the shape of first reflective surface 323 is applied to the surface of light guide 320 on the positive side of the Z-axis (first reflective surface 323) and the surface of light guide 320 on the negative side of the Z-axis (first reflective surface 323).

Embodiment 2

The configuration of an input device of embodiment 2 will be described with reference to FIG. 11A.

Figure 11A:
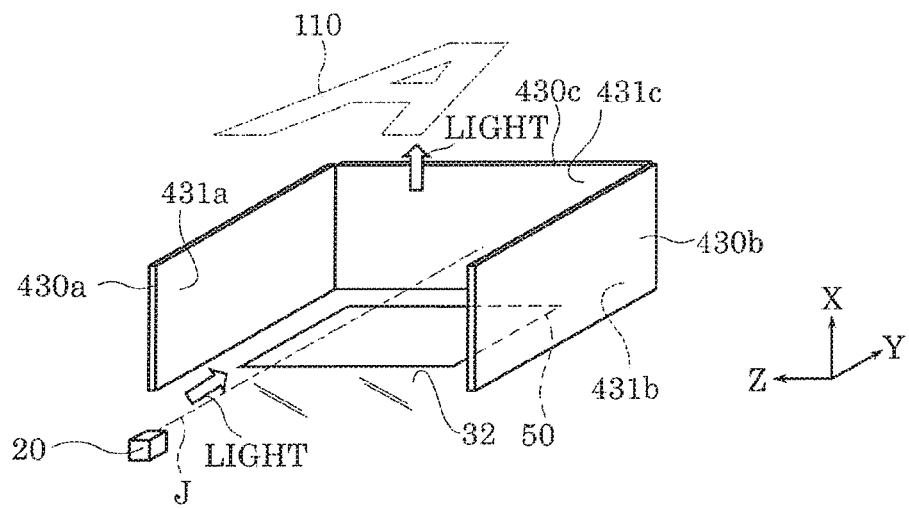
FIG. 11A is a schematic view illustrating an example of a light source and a light blocker according to embodiment 2.

FIG. 11A is a schematic view illustrating an example of light source 20 and light blockers 430a to 430c according to embodiment 2. In FIG. 11A, body 10, first sheet 31, etc., are omitted.

In this embodiment, the light guide according to embodiment 1 is not provided. Unless otherwise stated, other configurations according to this variation are the same as those according to embodiment 1. Substantially the same structural components are assigned with the same reference signs, and redundant descriptions will be omitted or simplified.

As shown in FIG. 11A, the input device further includes light blockers 430a to 430c.

Light blockers 430a to 430c each have a light blocking effect. Light blockers 430a to 430c are each made of a white or black resin material, and each have a light reflection function. Light blockers 430a to 430c have second reflective surfaces 431a to 431c, respectively. Light blockers 430a to 430c are an example of a guide.

Body 10 includes a light path formed by light blockers 430a to 430c from light source 20 to design portion 110. More specifically, light blockers 430a to 430c are disposed perpendicular to second sheet 32. Paired light blockers 430a and 430b among light blockers 430a to 430c are parallel to optical axis J of light source 20 and disposed to face each other with a predetermined space provided therebetween. Furthermore, one light blocker 430c among light blockers 430a to 430c is disposed to face light source 20 across body 10.

It should be noted that although three light blockers 430a to 430c are disposed in this embodiment, only one light blocker 430c may be disposed to incline upwardly (in the positive direction of the X-axis) in a direction away from light source 20 (in the positive direction of the Y-axis). In other words, one light blocker 430c may be disposed in an inclined state.

It should be noted that light blockers 430a to 430c need not have second reflective surfaces 431a to 431c, respectively. Light blockers 430a to 430c may be each configured to have a non-light-transmissive film that does not transmit light or a light reflective film (corresponding to second reflective surfaces 431a to 431c) on at least one surface of a plate-shaped resin material (which may be transmissive). Here, the at least one surface of each of light blockers 430a to 430c refers to at least one of surfaces perpendicular to the Z-axis for light blocker 430a, at least one of surfaces perpendicular to the Z-axis for light blocker 430b, and at least one of surfaces perpendicular to the Y-axis for light blocker 430c.

Figure 11B:
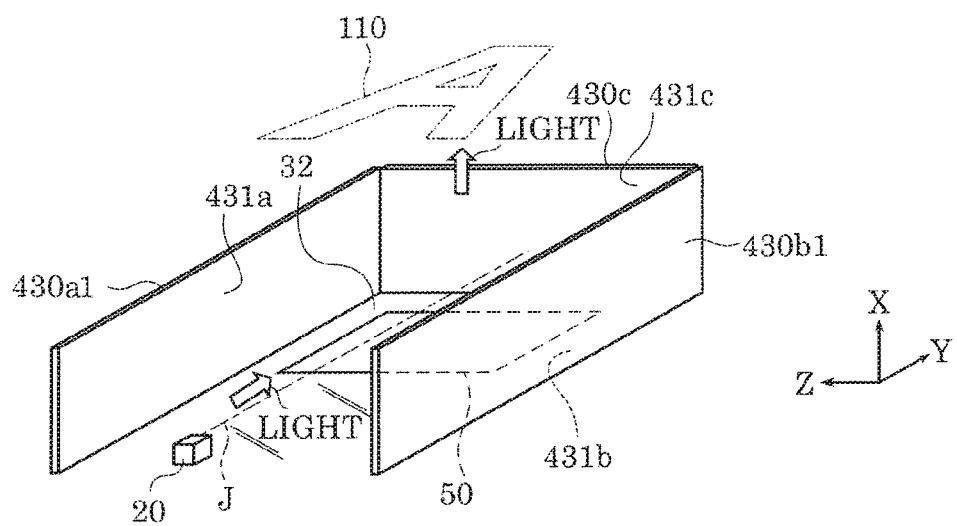
FIG. 11B is a schematic view illustrating an example of a light source and a light blocker according to a variation of embodiment 2.

Furthermore, the light blocker may be provided as shown in FIG. 11B. FIG. 11B is a schematic view illustrating an example of light source 20 and light blockers 430a1, 430b1, 430c according to embodiment 2.

As shown in FIG. 11B, light blockers 430a1, 430b1 are elongated along the Y-axis, and disposed across light source 20 in the Z-axis direction from each other. In other words, light source 20 is disposed between light blockers 430a1 and 430b1. With this, it is possible to more efficiently guide the light emitted from light source 20 toward design portion 110.

Furthermore, as described in embodiment 1, in a process for forming body 10, for example, light source 20 is covered in advance with a thermoset resin such as epoxy to protect light source 20 against a high temperature and pressure melted resin material when body 10 is insert-molded using a resin material.

Advantageous Effects

Next, the advantageous effects of the input device according to this embodiment will be described.

In the input device according to this embodiment, light blockers 430a to 430c are disposed to form a light path from light source 20 to design portion 110. Furthermore, light blockers 430a to 430c are each made of a white or black resin material. Accordingly, light blockers 430a to 430c can reflect light to block the light. With this, light blockers 430a to 430c form the light path from light source 20 to design portion 110, and thus it is possible to collect light into design portion 110.

This embodiment produces other advantageous effects in the same manner as embodiment 1.

Embodiment 3

The configuration of an input device of embodiment 3 will be described with reference to FIG. 12.

Figure 12:
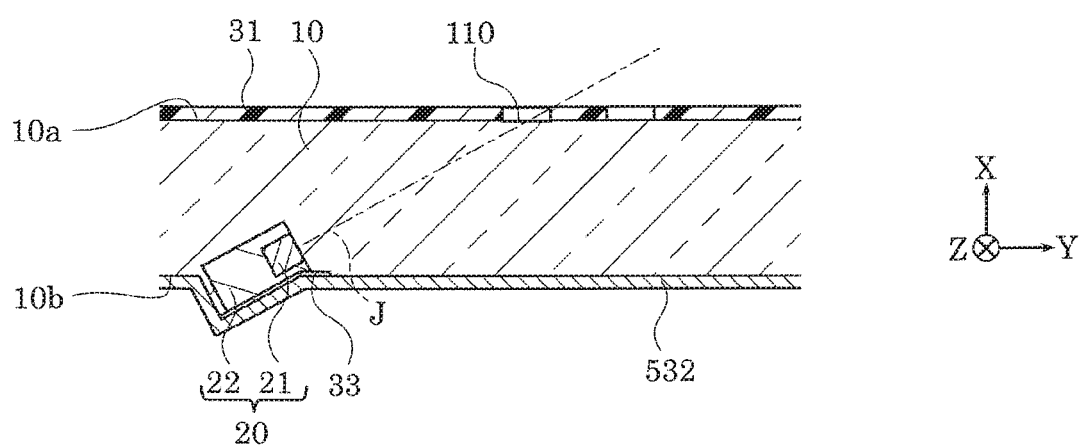
FIG. 12 is an exemplary cross-sectional view of an input device according to embodiment 3.

FIG. 12 is an exemplary cross-sectional view of the input device according to embodiment 3.

In this embodiment, the light guide according to embodiment 1 is not provided. Unless otherwise stated, other configurations according to this variation are the same as those according to embodiment 1. Substantially the same structural components are assigned with the same reference signs, and redundant descriptions will be omitted or simplified.

Light source 20 is mounted on second sheet 532 so that optical axis J of light emitted from light source 20 is directed toward design portion 110. In this embodiment, optical axis J of light source 20 is crossed with design portion 110.

Furthermore, light source 20 is embedded into body 10 to protrude from the back surface of body 10.

Second sheet 532 is formed to fit the shape of protruding light source 20. For example, second sheet 532 is formed before the mounting of light source 20 so that optical axis J of light emitted from light source 20 is directed toward design portion 110.

(Operation)

In such an input device, for example, light emitted from light source 20 is transmitted through body 10 toward design portion 110. A part of light collected into design portion 110 exits from design portion 110. The remaining part of the light is reflected at the back surface of first sheet 31, and returns back.

Advantageous Effects

Next, the advantageous effects of the input device according to this embodiment will be described.

In the input device according to this embodiment, light source 20 is mounted on second sheet 532 so that optical axis J of light emitted from light source 20 is directed toward design portion 110. Accordingly, it is possible to emit high-brightness light through design portion 110 of the input device.

This embodiment produces other advantageous effects in the same manner as embodiment 1.

It should be noted that, as described in embodiment 1, in a process for forming body 10, it is desirable that light source 20 is covered in advance with a thermoset resin such as epoxy to protect light source 20 against a high temperature and pressure melted resin material when body 10 is insert-molded using a resin material.

Variation of Embodiment 3

The configuration of an input device of a variation of embodiment 3 will be described with reference to FIG. 13.

Figure 13:
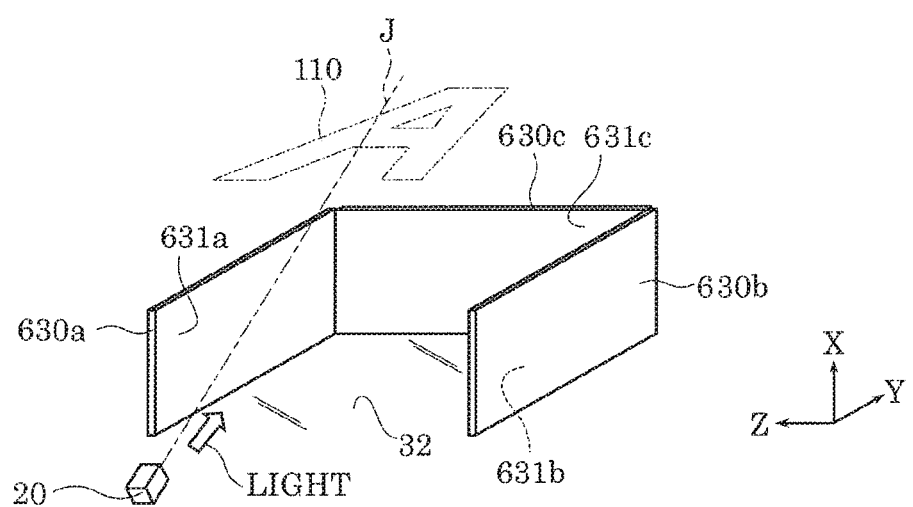
FIG. 13 is a schematic view illustrating an example of a light source and a light blocker according to a variation of embodiment 3.

FIG. 13 is a schematic view illustrating an example of light source 20 and light blockers 630a to 630c according to the variation of embodiment 3. In FIG. 11A, body 10, first sheet 31, etc., are omitted.

Unless otherwise stated, other configurations according to this variation are the same as those according to embodiment 3. Substantially the same structural components are assigned with the same reference signs, and redundant descriptions will be omitted or simplified.

The input device further includes light blockers 630a to 630c.

Light blockers 630a to 630c are each made of a white or black resin material, and each have a light reflection function, i.e. a transmissive characteristic. Light blockers 630a to 630c have second reflective surfaces 631a to 631c, respectively. Light blockers 630a to 630c are an example of a guide.

Light blockers 630a to 630c are disposed to form a light path. More specifically, light blockers 630a to 630c are disposed perpendicular to second sheet 32. Paired light blockers 630a and 630b among light blockers 630a to 630c are disposed with a predetermined space provided therebetween to face each other across body 10. Furthermore, one light blocker 630c among light blockers 630a to 630c is disposed to face light source 20 across body 10.

Embodiment 4

(Configuration)

The configuration of input device 800 of embodiment 4 will be described.

In this embodiment, the light guide according to embodiment 1, etc., is not provided. Unless otherwise stated, other configurations according to this variation are the same as those according to embodiment 1, etc. Substantially the same structural components are assigned with the same reference signs, and redundant descriptions will be omitted or simplified.

Figure 14:
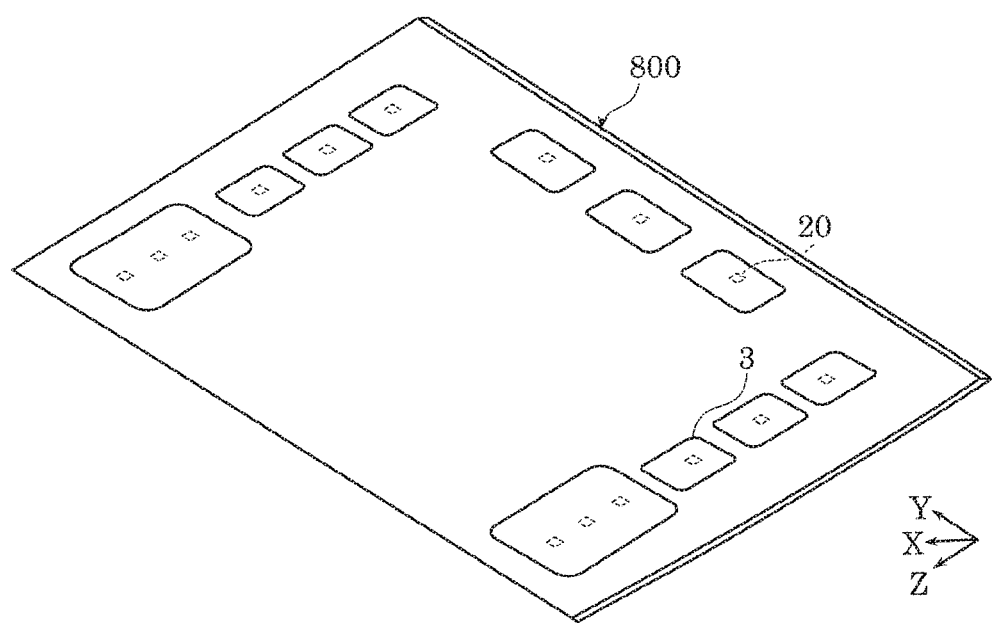
FIG. 14 is a perspective view illustrating an example of an input device according to embodiment 4.
Figure 15:
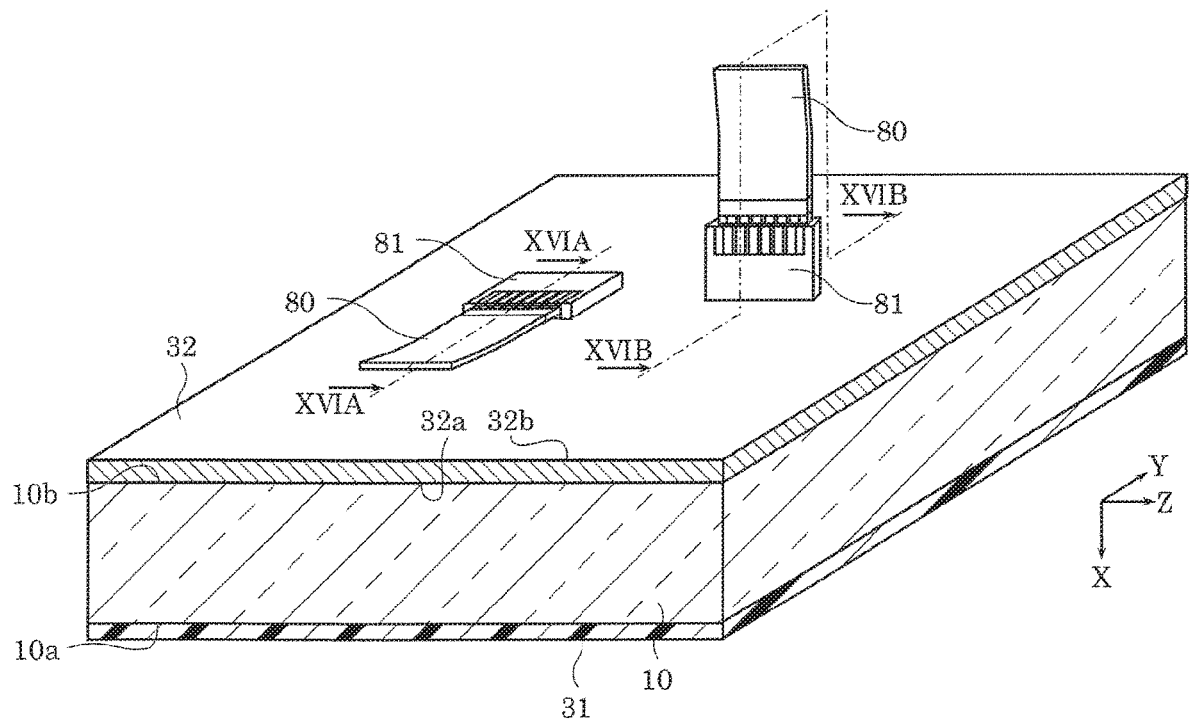
FIG. 15 is a perspective view illustrating an example of a second sheet, a connector, and a cable in an input device according to embodiment 4.
Figure 16A:
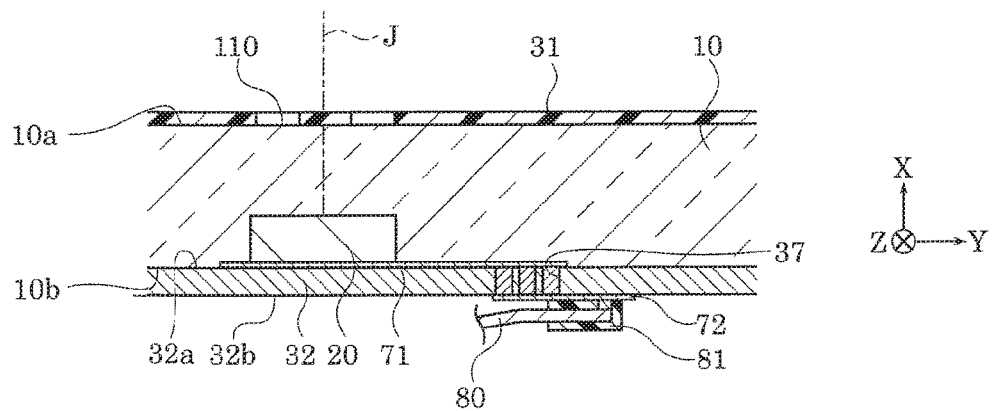
FIG. 16A is an exemplary cross-sectional view of the second sheet, the connector, and the cable in the input device taken along the line XVIA-XVIA in FIG. 15.
Figure 16B:
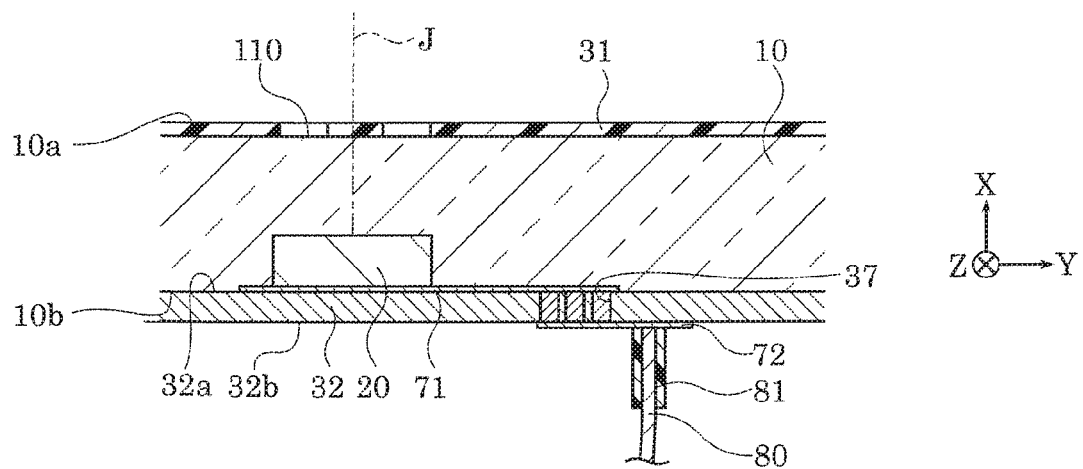
FIG. 16B is an exemplary cross-sectional view of the second sheet, the connector, and the cable in the input device taken along the line XVIB-XVIB in FIG. 15.

Input device 800 is described with reference to FIGS. 5 and 14. FIG. 14 is a perspective view illustrating an example of input device 800 according to embodiment 4. FIG. 15 is a perspective view illustrating an example of second sheet 32, connector 81, and cable 80 in input device 800 according to embodiment 4. FIG. 16A is an exemplary cross-sectional view of second sheet 32, connector 81, and cable 80 in input device 800 taken along the line XVIA-XVIA in FIG. 15. FIG. 16B is an exemplary cross-sectional view of second sheet 32, connector 81, and cable 80 in input device 800 taken along the line XVIB-XVIB in FIG. 15. Connector 81 and cable 80 are substantially perpendicular to second sheet 32.

Light sources 20 emit light toward design portion 110. In particular, light sources 20 are mounted on second sheet 32 while being mounted on conductive pattern 71, for example, in FIGS. 16A and 16B, so that light is emitted in the positive direction of the X-axis. More specifically, light source is disposed in body 10 so that the optical-axis direction of the emitted light, i.e. the positive direction of the X-axis is crossed with design portion 110. When input device 800 is viewed from the front surface, at least a part of each of light sources 20 is overlapped with design portion 110.

Second sheet 32 is layered onto back surface 10b of body 10, and reflects light transmitting through body 10 toward first sheet 31, etc. Second sheet 32 serves as a circuit board having conductive patterns 71, 72, on which light sources 20 are mounted.

Second sheet 32 has conductive pattern 71 on front surface 32a and conductive pattern 72 on back surface 32b. Light source 20 is mounted on conductive pattern 71 on front surface 32a of second sheet 32. Light sources 20 is mounted on second sheet 32 so that optical axis J of light source 20 is directed toward design portion 110.

Furthermore, second sheet 32 has through holes 37 between conductive pattern 71 on front surface 32a and conductive pattern 72 on back surface 32b. Through hole 37 is filled with conductive paste such as copper paste or silver paste. With this, conductive pattern 71 on front surface 32a and conductive pattern 72 on back surface 32b are electrically connected via through holes 37. It should be noted that in this embodiment, multiple through holes 37 are formed, but one through hole 37 may be formed. Furthermore, through hole 37 is not limited to the configuration filled with the conductive paste. For example, conductive pattern 71 and conductive pattern 72 may be electrically connected by coating the wall surface of through hole 37 with copper. Furthermore, the copper coating of the wall surface of through hole 37 and the filling with the conductive paste may be implemented at the same time.

Connector 81 is disposed in conductive pattern 72 on back surface 32b of second sheet 32. Connector 81 is electrically connected with conductive pattern 72. Connector 81 is also electrically connected with a touch sensor electrode. The touch sensor electrode has the same configuration as embodiment 1, etc. The touch sensor electrode is provided on front surface 32a or back surface 32b of second sheet 32.

The position relationship between cable 80 and connector 81 disposed on second sheet 32 will be described.

Figure 17A:
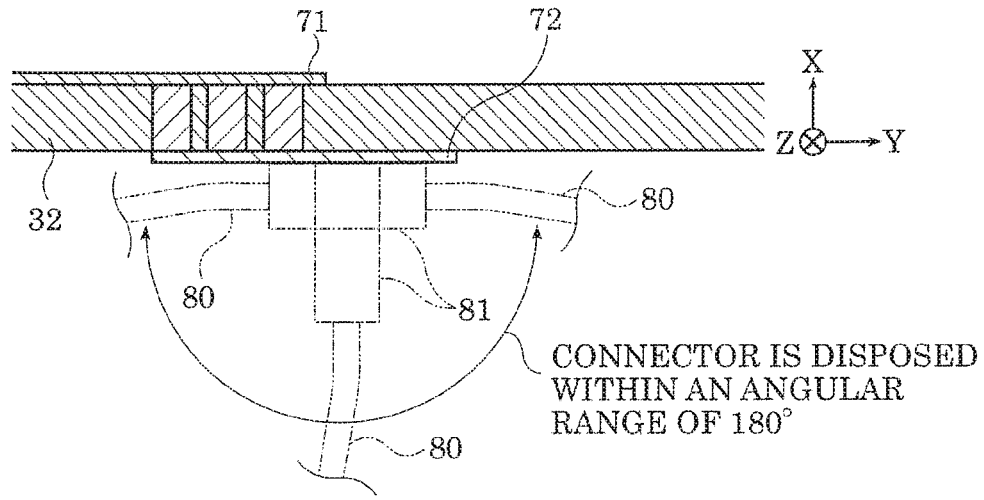
FIG. 17A is a schematic view illustrating an example of the second sheet, the connector, and the cable of when the connector is disposed in a position other than the ends of the second sheet.

Connector 81 disposed in a position other than the ends of second sheet 32 (e.g. the center portion of second sheet 32) is described with reference to FIG. 17A. FIG. 17A is a schematic view illustrating an example of second sheet 32, connector 81, and cable 80 of when connector 81 is disposed in a position other than the ends of second sheet 32. In FIG. 17A, the dashed double-dotted lines denote the orientation of connector 81 and three directions to which cable 80 is pulled out from connector 81.

In this case, cable 80 is disposed (pulled out) within an angular range of from one direction along back surface 32b of second sheet 32 (the negative direction of the Y-axis) to the other direction along back surface 32b of second sheet 32 (the positive direction of the Y-axis) via the direction perpendicular to second sheet 32 (the negative direction of the X-axis) (within an angular range of 0 to 180 degrees). In other words, any orientation is possible as long as connector 81 is electrically connected with cable 80, and connector 81 may be inclined at a predetermined angle with respect to back surface 32b of second sheet 32. Here, the orientation of the insert hole of connector 81 is opposed to the direction of inserting cable 80 into the insert hole of connector 81, and is the direction of pulling out cable 80 from connector 81.

Figure 17B:
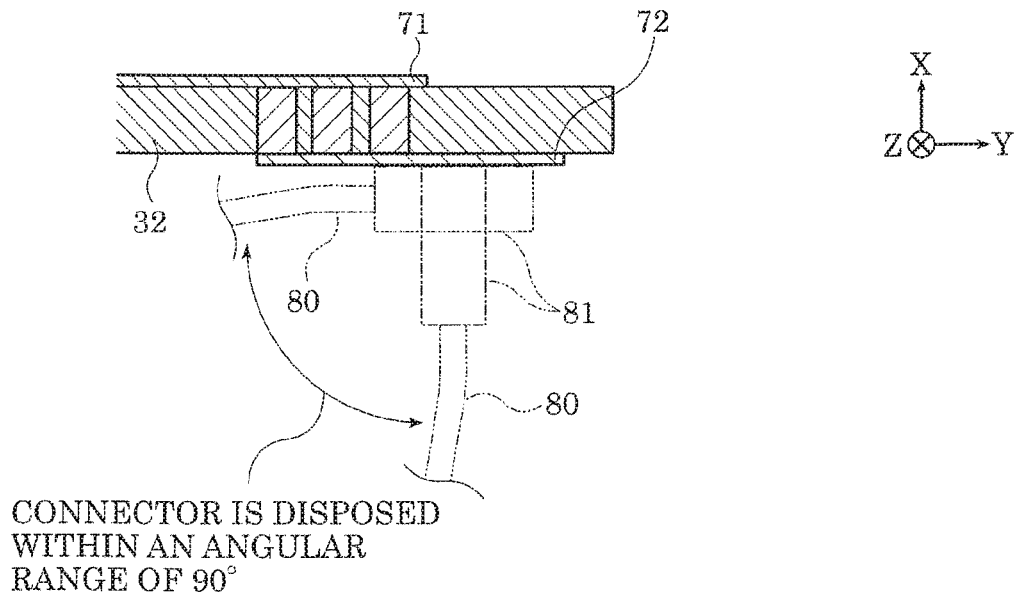
FIG. 17B is a schematic view illustrating an example of the second sheet, the connector, and the cable of when the connector is disposed in the end of the second sheet.

Furthermore, connector 81 disposed in the end of second sheet 32 is described with reference to FIG. 17B. FIG. 17B is a schematic view illustrating an example of second sheet 32, connector 81, and cable 80 in input device 800 of when connector 81 is disposed in the end of second sheet 32. In FIG. 17B, the dashed double-dotted lines denote the orientation of connector 81 and two directions to which cable 80 is pulled out from connector 81.

In this case, cable 80 is disposed (pulled out) within an angular range of from the direction along back surface 32b of second sheet 32 (the negative direction of the Y-axis) to the direction perpendicular to second sheet 32 (the negative direction of the X-axis). However, cable 80 is not disposed in any direction beyond second sheet 32 (in this embodiment, in the positive direction of the Y-axis). In other words, the orientation of the insert hole of connector 81 is not directed to a region between the negative direction of the X-axis and the positive direction of the Y-axis.

It should be noted that although not shown in the drawings, even when connector 81 is disposed in the end of second sheet 32, cable 80 may be disposed within an angular range of from the positive direction of the Z-axis to the negative direction of the Z-axis via the negative direction of the X-axis.

As described above, the possible position of cable 80 varies depending on the position of connector 81 in second sheet 32. At least when second sheet 32 is viewed in the direction perpendicular thereto, cable 80 is configured not to protrude from second sheet 32.

Figure 18A:
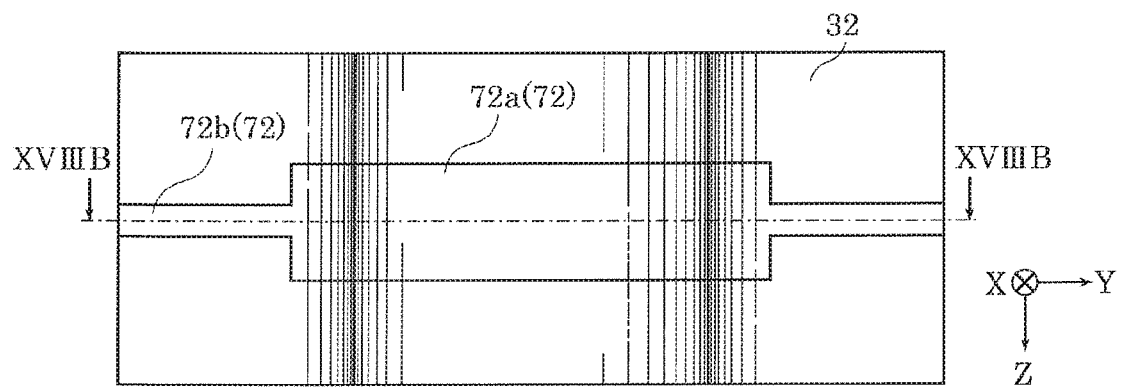
FIG. 18A is a plan view of the second sheet and a conductive pattern.
Figure 18B:
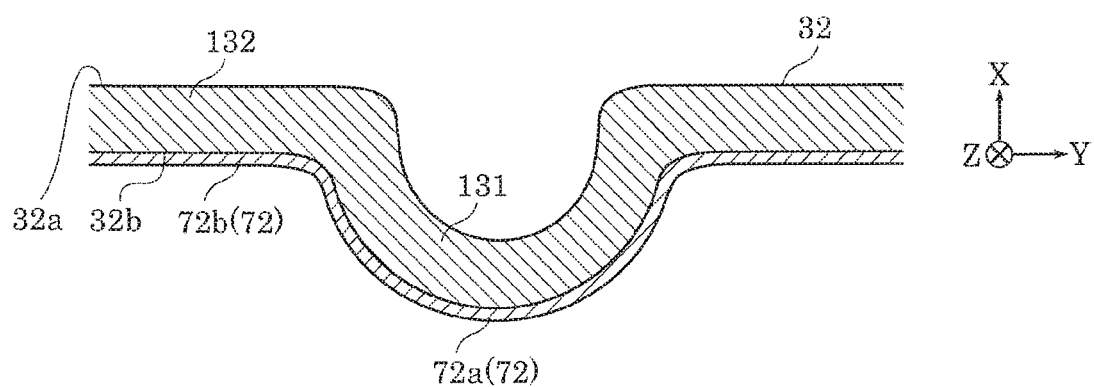
FIG. 18B is an exemplary cross-sectional view of the second sheet and the conductive pattern taken along the line XVIIIB-XVIIIB in FIG. 18A.

Furthermore, as shown in FIGS. 18A and 18B, second sheet 32 has curved portion 131 and plate-shaped planar portion 132 in which a plane is formed on back surface 32b. In this embodiment, an example of conductive pattern 72 on back surface 32b of second sheet 32 will be described. Conductive pattern 72 includes conductive pattern 72a and conductive pattern 72b. Here, FIG. 18A is a plan view of second sheet 32 and conductive pattern 72. Furthermore, FIG. 18B is an exemplary cross-sectional view of second sheet 32 and conductive pattern 72 taken along the line XVIIIB-XVIIIB in FIG. 18A.

When second sheet 32 is viewed in the direction perpendicular thereto, as shown in FIG. 18A, the width of conductive pattern 72a on curved portion 131 along the Z-axis is greater than the width of conductive pattern 72b on planar portion 132 along the Z-axis. This curved portion 131 is formed after conductive pattern 72 is formed on second sheet 32.

It should be noted that the same is true for curved portion 131 in conductive pattern 71 to be formed on front surface 32a of second sheet 32.

(Operation)

As shown in FIGS. 15 and 16A, in such input device 800, for example, light emitted from light source 20 transmits through body 10 and is collected into design portion 110 and the vicinity of design portion 110 of first sheet 31. A part of the light collected into design portion 110 and the vicinity of design portion 110 is emitted through design portion 110. The remaining part of the light is reflected at the back surface of first sheet 31 and also reflected at light source 20 to be collected into design portion 110 and the vicinity of design portion 110 of first sheet 31.

Advantageous Effects

Next, the advantageous effect of input device 800 according to this embodiment will be described.

Input device 800 according to this embodiment includes: light source 20 that emits light; first sheet 31 including design portion 110; second sheet 32 having conductive pattern 71 on which light source 20 is mounted; body 10 that is sandwiched between first sheet 31 and second sheet 32 and transmits the light emitted by light source 20; and connector 81 disposed on a back surface of second sheet 32 and electrically connected with conductive pattern 71, the back surface being on a side opposite to the side facing body 10. Connector 81 is electrically connected with cable 80. Cable 80 is disposed within an angular range of from a direction along back surface 32b of second sheet 32 to a direction perpendicular to second sheet 32.

As described above, connector 81 is disposed on the opposite surface of second sheet 32 to light source 20, and electrically connected with light source via conductive pattern 71. Accordingly, cable 80 such as a flat cable is connected with light source 20 via connector 81, and thus any conventional extended portions are unnecessary. With this, even when a stress is applied to input device 800, breaking of a wire (e.g. cable 80) rarely occurs.

Furthermore, when connector 81 is disposed on second sheet 32 to be directed toward another connector 81 to be connected, it is possible to smooth the pulling out of cable 80 electrically connected with connector 81 without folding cable 80. Accordingly, it is possible to prevent breaking of cable 80 caused by forcing cable 80 to fold.

Accordingly, it is possible to prevent breaking of wires such as cable 80, conductive patterns 71 and 72, and through holes inside input device 800.

Furthermore, in input device 800 according to this embodiment, when second sheet 32 is viewed in a direction perpendicular to second sheet 32, cable 80 does not protrude from second sheet 32.

For example, if cable 80 protrudes from second sheet 32 when second sheet 32 is viewed in the direction perpendicular thereto, the protrusion of cable 80 from input device 800 makes a gap in input device 800. This may reduce the waterproof effect or increase the size of input device 800 to cover cable 80. However, if cable 80 does not protrude from second sheet 32, this matter rarely occurs. With this, this input device 800 is easy to take measures for a waterproof configuration.

Furthermore, in input device 800 according to this embodiment, through holes 37 are formed between connector 81 and conductive pattern 71 (between conductive pattern 72 and conductive pattern 71). With this, connector 81 can be surface-mounted on second sheet 32, and thus it is possible to reduce the size of input device 800.

Furthermore, for example, when second sheet 32 is insert-molded using a melted resin, through hole 37 may be broken by flow thereinto of the high temperature and pressure melted resin. However, when through hole 37 comprises multiple through holes 37, even if some of through holes 37 are broken, the remaining through holes 37 electrically connect conductive pattern 71 on front surface 32a of second sheet 32 and connector 81 on back surface 32b of second sheet 32. Accordingly, it is possible to ensure the reliability in the insert molding of second sheet 32.

Furthermore, in input device 800 according to this embodiment, second sheet 32 has plate-shaped planar portion 132 and curved portion 131. Furthermore, a width of conductive pattern 72a on curved portion 131 in FIG. 18A is greater than a width of conductive pattern 72b on planar portion 132.

When second sheet 32 including conductive pattern 72 is formed, conductive pattern 72 on second sheet 32 is simultaneously formed. Accordingly, conductive pattern 72 may be broken by tension caused by the forming. However, conductive pattern 72 on curved portion 131 is greater in width than conductive pattern 72 on planar portion 132, and thus breaking of conductive pattern 71 caused by the forming rarely occurs. It should be noted that the same is true for conductive pattern 71 on front surface 32a of second sheet 32.

Furthermore, in input device 800 according to this embodiment, connector 81 is disposed on planar portion 132, and thus connector 81 rarely floats from back surface 32b of second sheet 32. Accordingly, connector 81 can be firmly fixed to second sheet 32.

Embodiment 5

The configuration of an input device of embodiment 5 will be described with reference to FIG. 19.

Figure 19:
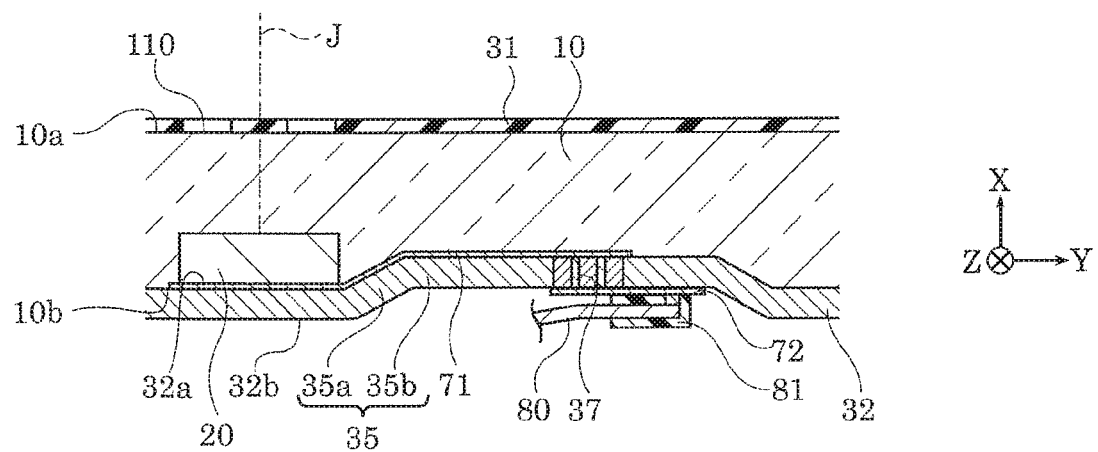
FIG. 19 is an exemplary cross-sectional view of a second sheet, a connector, and a cable in an input device according to embodiment 5.

FIG. 19 is an exemplary cross-sectional view of second sheet 32, connector 81, and cable 80 in the input device according to embodiment 5.

Unless otherwise stated, other configurations according to this variation are the same as those according to embodiment 4, etc. Substantially the same structural components are assigned with the same reference signs, and redundant descriptions will be omitted or simplified.

Second sheet 32 further includes depressed portion 35 that is deformed toward first sheet 31. Depressed portion 35 is created by forming and deforming second sheet 32. In this embodiment, depressed portion 35 is depressed in the positive direction of the X-axis.

The thickness of body 10 between first sheet 31 and depressed portion 35 is less than the thickness of body 10 between first sheet 31 and planar portion 132 of second sheet 32 excluding depressed portion 35.

In depressed portion 35, connector 81 is disposed. More specifically, depressed portion 35 has side portion 35a bending from planar portion 132 and bottom portion 35b corresponding to the bottom of depressed portion 35. Bottom portion 35b has a planar plane. Conductive patterns 71, 72 are formed on front surface 32a and back surface 32b of bottom portion 35b (front surface 32a and back surface 32b of second sheet 32), respectively.

Light source 20 is mounted on conductive pattern 71 on front surface 32a of bottom portion 35b. The mounting configuration of light source 20 to conductive pattern 71 is the same as that of embodiment 4. Connector 81 is mounted to conductive pattern 72 on back surface 32b of bottom portion 35b. Depressed portion 35 houses at least a part of connector 81.

Advantageous Effects

Next, the advantageous effects of the input device according to this embodiment will be described.

In the input device according to this embodiment, second sheet 32 further has depressed portion 35 that is deformed toward first sheet 31. Connector 81 is disposed in depressed portion 35. Accordingly, it is possible to prevent an increase in the thickness of the input device.

This embodiment produces other advantageous effects in the same manner as embodiment 4.

It should be noted that in this embodiment, the mounting configuration of light source 20 to conductive pattern 71 is the same as that of embodiment 4, but is not limited to this. In other words, for example, light source 20 may be mounted to conductive pattern 71 on bottom portion 35b of depressed portion 35. In this case, a distance between light source 20 and design portion 110 is decreased by depressed portion 35. Accordingly, it is possible to increase the brightness of design portion 110. Alternatively, it is possible to reduce the power consumption of light source 20 since the light amount of light source 20 can be decreased to obtain the same brightness of design portion 110.

(Others)

The present disclosure has been described with reference to embodiments 1 to 5, variations 1 and 2 of embodiment 1, and a variation of embodiment 3, but is not limited to the foregoing input devices.

For example, in the input devices according to embodiments 1 to 5, variations 1 and 2 of embodiment 1, and a variation of embodiment 3, the light sources may emit light toward the light guide to sandwich the light guide. In other words, light may enter the light guide through both sides thereof.

Furthermore, the input devices according to embodiments 1 to 5, variations 1 and 2 of embodiment 1, and a variation of embodiment 3 can be achieved by putting, in a prepared mold, a component having the light source, the control circuit, etc., disposed on the surface of the first sheet, and being insert-molded using the resin material to form the body. Alternatively, the input devices may be achieved by manufacturing only the body in advance by insert molding before a component having the light source, the control circuit, etc., disposed on the surface of the first sheet is fitted into the body.

Furthermore, in the input devices according to embodiments 1 to 5, variations 1 and 2 of embodiment 1, and a variation of embodiment 3, the design portion may be formed by a patterning process of a two-color molding resin or a coating film using laser, a mask process (such as screen printing), an in-mold transfer printing process, a three dimension overlay method (TOM) process, an insert molding, etc. It should be noted that the forming of the design portion is not limited to this. Other known means may be employed.

Furthermore, the input devices according to embodiments 1 to 5, variations 1 and 2 of embodiment 1, and a variation of embodiment 3 may be energized from a battery, etc. For example, the electrical power may be supplied from the power supply of the vehicle or the commercial power supply.

Furthermore, in the input devices according to embodiments 1 to 5, variations 1 and 2 of embodiment 1, and a variation of embodiment 3, the first sheet and the second sheet each mean that a film is included.

Furthermore, the input devices according to embodiments 1 to 5, variations 1 and 2 of embodiment 1, and a variation of embodiment 3 may be applied to not only the cover of the storage box, but also, for example, an input device provided to an armrest or an inner door surface which requires a thinner input device.

The input devices according to one or more aspects of the present disclosure has been described above based on embodiments 1 to 5, variations 1 and 2 of embodiment 1, and a variation of embodiment 3. However, the present disclosure is not limited to embodiments 1 to 5, variations 1 and 2 of embodiment 1, and a variation of embodiment 3. Various modifications to embodiments 1 to 5, variations 1 and 2 of embodiment 1, and a variation of embodiment 3 that can be conceived by those skilled in the art, and forms configured by combining structural elements in different embodiments without departing from the spirit of the present disclosure may be included in the scope of the one or more aspects of the present disclosure.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following Japanese Patent Applications including specification, drawings and claims are incorporated herein by references on their entirety: Japanese Patent Application Number 2018-189876 filed on Oct. 5, 2018, Japanese Patent Application Number 2018-189774 filed on Oct. 5, 2018, and Japanese Patent Application Number 2019-069615 filed on Apr. 1, 2019.

INDUSTRIAL APPLICABILITY

The present disclosure is useful as an input device, etc., capable of emitting high-brightness light through the design portion of the input device.

What is claimed is:

1. An input device, comprising:
    a light source that emits light;
    a first sheet including a design portion;
    a second sheet having a conductive pattern on which the light source is mounted and in which a touch sensor electrode is disposed in a position different from the light source;
    a body that is sandwiched between the first sheet and the second sheet to be integral with the first sheet and the second sheet, and transmits the light emitted by the light source; and
    a guide disposed in a light path from the light source to the design portion, the guide guiding light transmitting through an inside of the body toward the design portion and being distinguished from the body, wherein
    the light source and the guide are disposed along a surface of the second sheet on a side facing the body,
    the body is integral with the light source and the guide and encapsulates the light source and the guide,
    the guide is a light guide having an incident surface which faces the light source and through which light enters, a light exit surface which faces the design portion and through which light exits, and a reflective surface which is a surface other than the incident surface and the light exit surface and reflects light transmitting through an inside of the light guide toward the light exit surface,
    the reflective surface has an inclined surface, and
    the inclined surface is disposed on an opposite side of the incident surface to the light source to interpose the incident surface between the light source and the inclined surface, and is disposed on an opposite side of the light exit surface to the design portion to interpose the light exit surface between the design portion and the inclined surface.

2. The input device according to claim 1, wherein a light diffusion material is dispersed in at least one of the incident surface, the light exit surface, and the inside of the light guide.

3. The input device according to claim 1, wherein a softening point of the light guide is higher than a softening point of the body.

4. The input device according to claim 1, wherein the first sheet blocks light other than light passing through a region of the design portion.

5. The input device according to claim 1, further comprising:
    a connector disposed on a back surface of the second sheet and electrically connected with the conductive pattern and the touch sensor electrode, the back surface being on a side opposite to the side facing the body.

6. The input device according to claim 5, wherein the connector is electrically connected with a cable, and when the second sheet is viewed in a direction perpendicular to the second sheet, the cable does not protrude from the second sheet.

7. The input device according to claim 6, wherein
the cable is disposed within an angular range of from a direction along the back surface of the second sheet to a direction perpendicular to the second sheet.

8. The input device according to claim 5, wherein
the second sheet has the conductive pattern on a front surface of the second sheet, and includes a through hole electrically connecting the connector and the conductive pattern, the front surface being on a side opposite to the back surface.

9. The input device according to claim 5, wherein
the second sheet has a planar portion and a curved portion, the planar portion being plate-shaped, and
a width of the conductive pattern on the curved portion is greater than a width of the conductive pattern on the planar portion.

10. The input device according to claim 5, wherein
the second sheet further has a depressed portion that is deformed toward the first sheet, and
the connector is disposed in the depressed portion.

11. The input device according to claim 1, wherein
the second sheet is a flexible printed wiring board.

12. The input device according to claim 1, wherein
the light guide is disposed along the surface of the second sheet on the side facing the body so that at least a light emitting surface of the light source is covered.

13. An input device, comprising:
a light source that emits light;
a first sheet including a design portion;
a second sheet having a conductive pattern on which the light source is mounted and in which a touch sensor electrode is disposed in a position different from the light source;
a body that is sandwiched between the first sheet and the second sheet to be integral with the first sheet and the second sheet, and transmits the light emitted by the light source; and
a guide disposed in a light path from the light source to the design portion, the guide guiding light transmitting through an inside of the body toward the design portion and being distinguished from the body, wherein
the light source and the guide are disposed along a surface of the second sheet on a side facing the body,
the body is integral with the light source and the guide and encapsulates the light source and the guide,
the guide is a light guide having an incident surface which faces the light source and through which light enters, a light exit surface which faces the design portion and through which light exits, and a reflective surface which is a surface other than the incident surface and the light exit surface and reflects light transmitting through an inside of the light guide toward the light exit surface, and
at least one of a light reflective sheet and a light reflective material layered on the light guide is disposed on the reflective surface.

14. An input device, comprising:
a light source that emits light;
a first sheet including a design portion;
a second sheet having a conductive pattern on which the light source is mounted and in which a touch sensor electrode is disposed in a position different from the light source;
a body that is sandwiched between the first sheet and the second sheet to be integral with the first sheet and the second sheet, and transmits the light emitted by the light source; and
a guide disposed in a light path from the light source to the design portion, the guide guiding light transmitting through an inside of the body toward the design portion and being distinguished from the body, wherein
the light source and the guide are disposed along a surface of the second sheet on a side facing the body,
the body is integral with the light source and the guide and encapsulates the light source and the guide,
the guide is a light blocker having a light blocking effect,
the body includes the light path formed by the light blocker, and
the light blocker is configured to have a non-light-transmissive film that does not transmit light or a light reflective film on at least one surface of a resin material.

* * * * *